United States Patent [19]
Baker et al.

[11] Patent Number: 6,116,907
[45] Date of Patent: Sep. 12, 2000

[54] SYSTEM AND METHOD FOR ENCODING AND RETRIEVING VISUAL SIGNALS

[75] Inventors: David Baker, Wellsville; David Taylor, Provo, both of Utah

[73] Assignee: Sorenson Vision, Inc., Salt Lake City, Utah

[21] Appl. No.: 09/006,127

[22] Filed: Jan. 13, 1998

[51] Int. Cl.[7] .............................. G09B 19/00; G09B 1/00; G09B 3/02; G09B 17/00; G09B 19/04

[52] U.S. Cl. ......................... 434/156; 434/167; 434/176; 434/178; 434/185

[58] Field of Search .................................. 434/156, 159, 434/167, 176, 178, 185

[56] References Cited

U.S. PATENT DOCUMENTS

| | | | |
|---|---|---|---|
| 4,546,383 | 10/1985 | Abramatic et al. | 348/19 |
| 4,879,210 | 11/1989 | Hamilton | 434/112 |
| 5,473,705 | 12/1995 | Abe et al. | 382/100 |
| 5,481,454 | 1/1996 | Inoue et al. | 704/3 |
| 5,544,050 | 8/1996 | Abe et al. | 707/532 |
| 5,734,923 | 3/1998 | Sagawa et al. | 345/302 |
| 5,887,069 | 3/1999 | Sakou et al. | 382/100 |

OTHER PUBLICATIONS

Baker, David S. A Theoretical Basis for Creating a System of Transcription for American Sign Language. Aug., 1997.
Stokoe, William C. Jr. 1978, Sign language structure. Silver Springs, MD: Linstock Press.
Brentari, Diane. 1993. Establishing a sonority hierarchy in American Sign Language: the use of simultaneous structure in phonology. Phonology 10 pp. 281–306.
Perlmutter, David M. 1992. On the Segmental Representation of Transitional and Bidirectional Movements in ASL Phonology. Theoretical issues in sign language research; vol. I Linguistics, ed. By Susan d. Fischer and Patricia Siple, 67–80. Chicago: University of Chicago Press.
Liddell, Scott K. 1990. Structures for Representing Handshape and Local Movement at the Phonemic Level. Theoretical issues in sign language research; vol. I: Linguistics, ed. By Susan d. Fischer and Patricia Siple, 37–65. Chicago: University of Chicago Press.
van der Hulst, Harry. 1993. Units in the analysis of signs. Phonology 10. pp. 209–241.
Sandler, Wendy. 1990. Temporal aspects and ASL phonology. Theoretical issues in sign language research; vol. I; Linguistics, By Susan D. Fischer and Patricia Siple, 7–35. Chicago: University of Chicago Press.
Corina, David and Wendy Sandler. 1993. On the nature of phonological structure in sign language. Phonology 10. 165–207.

(List continued on next page.)

*Primary Examiner*—Robert A. Hafer
*Assistant Examiner*—John Edmund Rovnak
*Attorney, Agent, or Firm*—Trask, Britt & Rossa

[57] ABSTRACT

A method and system are disclosed for encoding signs in a given sign language. The sign typically uses a dominant hand for some signs and a second hand is used for other signs the dominant hand remaining dominant of the two hands. In order to encode the signs into a useful form, each hand has various articles defined. The first article is that of handshape for both hands. The next article is that of palm orientation, with location and movement being the next two articles. A parametric value is associated with each of these particular articles. A combination of the articles, such as an article's concatenation in a parametric value string, allows for the transcription of a particular sign. Using this parametric value or even parts of the parametric value for the combined sign, a desired sign or a group of signs may be identified that closely resembles the particular sign being encoded. From this group of signs, the user can identify the exact sign that is of interest or that matches the sign desired by the user. A unique total parametric value is defined for each sign within the given sign language for matching against any of the articles identified by the user.

18 Claims, 18 Drawing Sheets

OTHER PUBLICATIONS

Sandler, Wendy. 1993. A sonority cycle in American Sign Language. Phonology 10. 243–79.

Wilbur, Ronnie B. 1990. Why syllables? What the notion means for ASL research. Theoretical issues in sign language research; vol. I: Linguistics, ed. by Susan D. Fischer and Patricia Siple, 81–108. Chicago: University of Chicago Press.

Liddell, Scott. and Robert E. Johnson. 1989. American Sign Language: the phonological base. Sign Language Studies 64. pp. 195–278.

Stokoe, William C., Jr. 1989. The Deaf Way to New Dictionaries of Sign Languages. Sign Language Studies 65. pp. 279–286.

Rimor, Mordechai, Judy Kegl, Harlan Lane, Trude Schermer. 1984. Natural Phonetic Processes Underlie Historical Change & Register Variation In American Sign Language. Sign Language Studies 43. pp. 97–119.

Schick, Brenda. 1990. The Effects of Morphological Complexity On Phonological Simplification in ASL. Sign Language Studies 66. pp. 25–41.

Greenlee, Douglas. 1974. Pierce's Concept of Sign. Approaches to Semiotics, Paperback Series 5, edited by Thomas A. Sebeok. Sign Language Studies 6. pp. 104–108.

Green, Kerry. 1984. Sign Boundaries in American Sign Language. Sign Language Studies 42. pp. 65–89.

Perlmutter, David M. 1992. Sonority and syllable structure in American sign Language.

Shlonsky, Ur. 1992. Resumptive Pronouns as a Last Resort. Linguistic Inquiry 23. pp. 443.

Shields, Lynne, W. and David A. Balota. 1991. Repetition and Associative Contact Effects in Speech Production. Language and Speech 34(I). p. 47.

Brentari, Diane. 1992. Phonological representation in American Sign Language. Language 68 (2). pp. 359–375.

Wilbur27–46., Ronnie B. and George D. Allen. 1991. Perceptual evidence against internal structure in American Sign Language syllables. Language and Speech 34. pp.

Wilbur, Ronnie B. and Susan Bobbitt Nolen. 1986. The duration of syllables in American Sign Language. Language and Speech 29. pp. 263–280.

Coulter, Geoffrey R. 1991. On the relevance of traditional phonological analysis to the abstract patters found in ASL and other signed languages. Brides between psychology and linguistics: A Swarthmore festschrift for Lila Gleitman, ed. By Donna Jo Napoli and Judy Anne Kegl, 225–45. Hillsdale, NJ: Lawrence Erlbaum Associates.

Lane, Harlan, Penny Boyes–Braem and Ursula Bellugi. 1976. Preliminaries to a distinctive feature analysis of handshapes in American Sign Language. Cognitive Psychology 8. pp. 263–289.

| Parameter Group | Number of Features | Possible Values | Group Weight |
|---|---|---|---|
| Dominant handshape start position | 6 | 1-6 | 54 |
| Dominant handshape end position | 6 | 1-6 | 54 |
| Non-dominant handshape start pos | 6 | 1-6 | 54 |
| Non-dominant handshape end pos | 6 | 1-6 | 54 |
| Dominant hand orientation start | 1 | 1-63 | 40 |
| Dominant hand orientation end | 1 | 1-63 | 40 |
| Non-dominant hand orientation start | 1 | 1-63 | 40 |
| Non-dominant hand orientation end | 1 | 1-63 | 40 |
| Dominant hand location start | 3 | 1-20 | 29 |
| Dominant hand location end | 3 | 1-20 | 29 |
| Non-dominant hand location start | 3 | 1-20 | 29 |
| Non-dominant hand location end | 3 | 1-20 | 29 |
| Dominant hand movement | 5 | 1-63/1-5 | 50 |
| Non-dominant hand movement | 5 | 1-63/1-5 | 50 |
| Non-manual | 1 | 1-3 | 20 |

SYSTEM AND METHOD FOR ENCODING AND RETRIEVING VISUAL SIGNALS

BACKGROUND OF THE INVENTION

1. Field of the Invention

The present invention relates generally to sign linguistics and, more particularly, to providing a system and method of encoding, storing, and retrieving signs in a given sign language.

2. Related Art

Sign languages are developed naturally around the world wherever communities of deaf people exist. In recent years, more and more hearing people have been learning these sign languages for various reasons. Many individuals must learn sign language as a second language and must confront its intricacies and meaning. One problem in sign language teaching and learning is the lack of a practical system for encoding signs into a useable phonetic form.. As hearing people attempt to learn signed languages, though, they are faced with several difficult challenges.

Prior attempts to encode sign language have met with limited success. One approach is to suggest that signs are composed of a location, hand shape and movement. Unfortunately, additional features of sign language, such as palm orientation and non-manual behavior, are ignored.

The four dimensional nature of signed language makes it difficult to represent phonetically or graphically. The first three dimensions are the common spatial dimensions while the fourth dimension is time or the sequence of movement while signing. Students of signed languages experience this difficulty while trying to take notes in class. Prior efforts to encode or translate have had limited success because they have relied on using only two dimensions.

A written system for American Sign Language (ASL) has been introduced by Baker-Shenk and Cokely, and this system can be used efficiently to indicate syntactic relationships of signed utterances. It must be understood that encoding is different than writing. Transcription, by contrast, is the ability to record what has been signed using phonetic citation. The written system falls short of being a useful transcription system. A separate system for representing signs in isolation that shows a sign's phonetic structure would be useful to learn, teach, and understand signing. Students in many sign language classes are taught something about the parametric structure of the language, but are given no application for this information. A basic taxonomy would help students in note taking and vocabulary study. Further, a transcription system would help students build a model of the language as they try to digest the information that is presented to them in class. In pedagogical application of the transcription system, there are three types of sign language materials. These include printed, video taped and computerized materials.

Books and other printed materials have drawbacks when it comes to conveying understanding of sign language. The pages are flat and their contents are static. They typically use actual photographs of actual signers or simple line drawings. As the pictures cannot move and since motion is crucial to signing, various techniques have been developed to present four dimensional motion in a two dimensional form. Ribbon arrows, dotted lines, and multiple frames are among the different solutions. While these solutions are helpful, they still only simulate three dimensionality in a two dimensional medium. They commonly describe the sequential movement of the signing movement, or the fourth dimension (time). Some signs cannot be thus displayed with pictorial information because the additional dimensions are missing.

In other words, many dictionaries give a narrative description of each sign. Unfortunately, written descriptions can be and sometimes are as obtuse and confusing as the pictures themselves. An additional problem in dictionaries is that of dominance. When a right-handed person signs, his or her right hand is dominant. This dominant hand takes on the larger part of the signing load, functioning alone in one-handed signs, performing the major action and unbalanced two-handed signs. Likewise, when most left-handed people sign, their left hand performs the dominant functions. In the dictionaries, right dominance is presumed and can cause difficulties for left dominant signers. With pictures, it is simple mentally to flip an image; however, with narrative descriptions, phrases like "move your right hand" or "press your left arm" can cause students difficulty.

Video tape and video recordings have the advantage of being able to represent signs in motion. Unfortunately, videotaped renditions of signed symbols suffer from the ability to provide quick access. A student cannot simply open up a video text and turn to a specific example sign. Fast forwarding, rewinding, and time codes become the only way to find a particular segment. Thus, video tapes become too cumbersome to be of practical value in a real time situation.

Video images can now be transferred to a computerized manipulation with the introduction of such software programs as "QuickTime," developed and produced by Apple Computers, and MPEG Digital Video Technology. Both provide full computerized motion of signs. Computers provide the ability to present multimedia examples of the signs. Computers can present the information as digital video, still pictures, text, and sound. Digital video still has some drawbacks. One drawback is the same as with using video tapes, which is the requirement for special equipment. The most significant problem however is that of storage. The size of a full motion, digitized sign can range from several hundred kilobytes to several megabytes. Furthermore, digital video, once compressed, can sometimes be quite grainy. An example of a sign language dictionary put on CD-ROM did include over 2,000 signs on one disc, but the visual clips were so unclear or grainy so they were not very useful. Yet the computerization of the signing language with the power of locating a particular sign, once properly defined, is highly desirable.

Encoding the acoustic signs of a spoken language requires specific knowledge of the vocal gestures of which the words are composed. An accurate written version of an English utterance is distinctly different from an phonetic or phonological transcription. Both represent something a person actually said, but they represent different kinds elements.

Accordingly, what is needed is a method and system for encoding individual signs in a manner that allows a user to readily identify the sign upon review or locate the sign in a searchable data base that uses a search engine based on the transcription method.

BRIEF SUMMARY OF THE INVENTION

According to the present invention, a method and system are disclosed for encoding signs in a given sign language. The sign typically uses a first and sometimes a second hand. In order to encode the signs into a useful form, each hand has various articles defined. The first article is that of handshape for one or both hands. The next article is that of orientation, with location, movement, and non-manual behavior being the next three articles. Each article has one or more forms or versions. A parametric value is associated with each of these particular articles. A linking of the articles, or concatenation, in a parametric value string, allows for the transcription of a particular sign. Using this parametric value or even parts of the parametric value for the combined hand sign, a desired sign or a group of signs may be identified that closely resemble the particular hand sign being encoded. From this group of signs, the user can identify the exact sign that is of interest or that matches the sign desired by the user. A unique total parametric value is defined for each sign within the given sign language for matching against any of the articles identified by the user.

Thus, the parametric value can be based, for each of the signs within the sign language, on any one of the particular articles such as the handshape, orientation, location, or movement article for either a first or second hand, or both. Additionally, non-manual articles are possible for inclusion in and subsequent identification of the parametric value.

In addition to the encoding aspect of the present invention, a method and system for encoding the signs is also provided. The method and system for encoding the signs is similar to that of encoding. Specifically, the handshape, orientation, location, and movement of both the first and second hand are defined with a particular parameter value assigned to each article. Each parametric value is added to establish a total parametric value for each of signs. Once each sign is encoded, it can be quickly retrieved by matching the form of the various articles that match those for the particular encoded sign desired by the user.

Once the system has retrieved a group or a single word, the user can select one word within the group or the particular word for display. Additionally, this method can be performed on a computer system having a display monitor, with the results being viewed in a graphical user interface environment. As it is useful on a computer system, it is stored on a computer usable storage medium such as a floppy disc drive, hard disc drive, a CD ROM, or any other type of computer readable medium or computer accessible source, such as a network drive or an internet database.

BRIEF DESCRIPTION OF THE SEVERAL VIEWS OF THE DRAWING

FIG. 15 is a matrix detailing the parameter groups, their number of features, their possible values, and their group weighting;

DETAILED DESCRIPTION OF SPECIFIC EMBODIMENTS OF THE INVENTION

Figure 1:
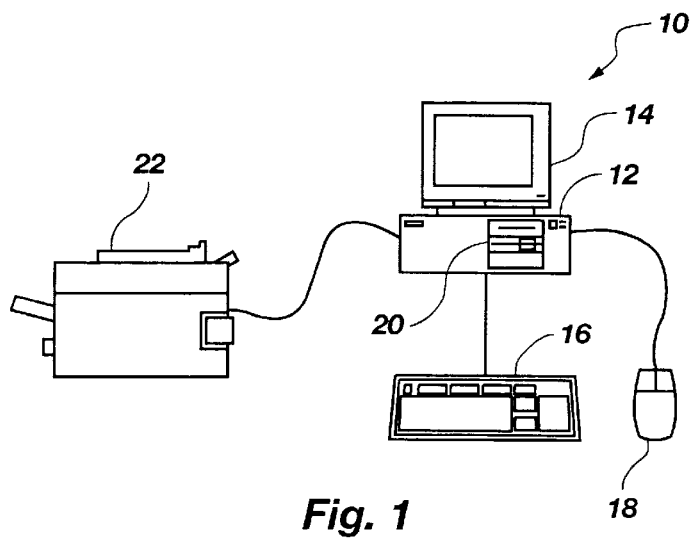
FIG. 1 is a diagram illustrating a computer system on which the present invention is implemented.

The present invention is a computer implementable method for encoding or translating visual signals typically used in sign language. The present invention encodes, stores, and retrieves the visual signals on a computer system. A diagram of a computer system 10 is shown in FIG. 1. Computer system 10 includes a processing unit 12, which is further connected to a video monitor 14, keyboard input 16, and a pointing device such as mouse 18. Processing unit 12 further includes memory storage unit 20, which includes short term removable memory components, such as either a floppy disk drive and a CD drive, and long term memory such as a hard disk drive. Additional memory storage that is included in memory storage unit 20 includes random accessible memory (RAM), cache memory, and even dedicated video memory. Processing unit 12 further includes additional computer elements such as a microprocessor, data communication cards, audio cards with speakers, a microphone, and other hardware peripheral devices, such as a modem. Printer device 22 is provided to print images selected by the user.

One embodiment of computer system 10 is an IBM-compatible personal computer using a microprocessor from the Intel family of processors and operates under a graphical user interface (GUI), such as "Windows95 ®," developed by MicroSoft Corporation of Seattle, Wash. The microprocessor should have the capabilities of at least an 80486 model processor operating at 66 megaHertz (MHZ), manufactured by Intel Corp of Santa Clara, Calif. The system should have at least 8 megabytes (MB) of RAM, but preferably 16 MB. Additionally, the Windows program should incorporate a video display program such as "QuickTime," developed by Apple Computer Corporation ("Apple") of Cupertino, Calif.

An alternative embodiment of computer system 10 is a Macintosh-compatible system, the system requires a microprocessor at least comparable to a 68040 microprocessor or greater provided by Motorola of Schaumberg, Ill., have at least 8 MB of RAM, preferably 12 MB, and operate under the "System 7" or later versions of the operating system provided by Apple. The system can utilize computers of lesser abilities than those described above, but will do so with less than optimal performance.

A method for encoding, storing, and retrieving visual signals, typically those used in sign language, is rendered into computer usable code that is utilized on computer system 10 is described below. The method can retrieve one or more signs that meet the criteria for the search and allow the user to select the sign desired. The search looks for signs that are close in description, without having to be an exact match, so that a powerful retrieval system is provided. The program is loaded on a memory medium for long term storage such as either a floppy disk, a CD disk, or a hard disk storage unit located within computer system 10. An alternative way to implement the program is to load the system on a network database and then allow access to selected users connected to the network following proper network protocol and control. The network can be an internet-based network where the user accesses the network via modem.

Figure 16:
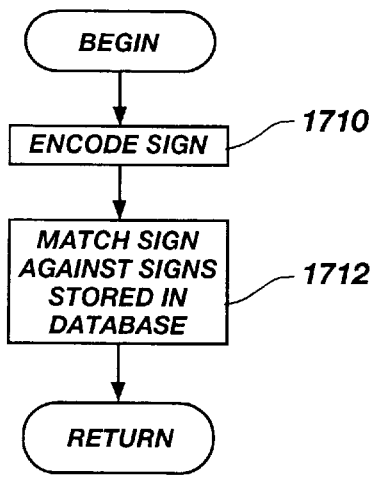
FIG. 16 is a block diagram depicting the retrieval of a sign using the transcription according to the present invention.
Figure 17:
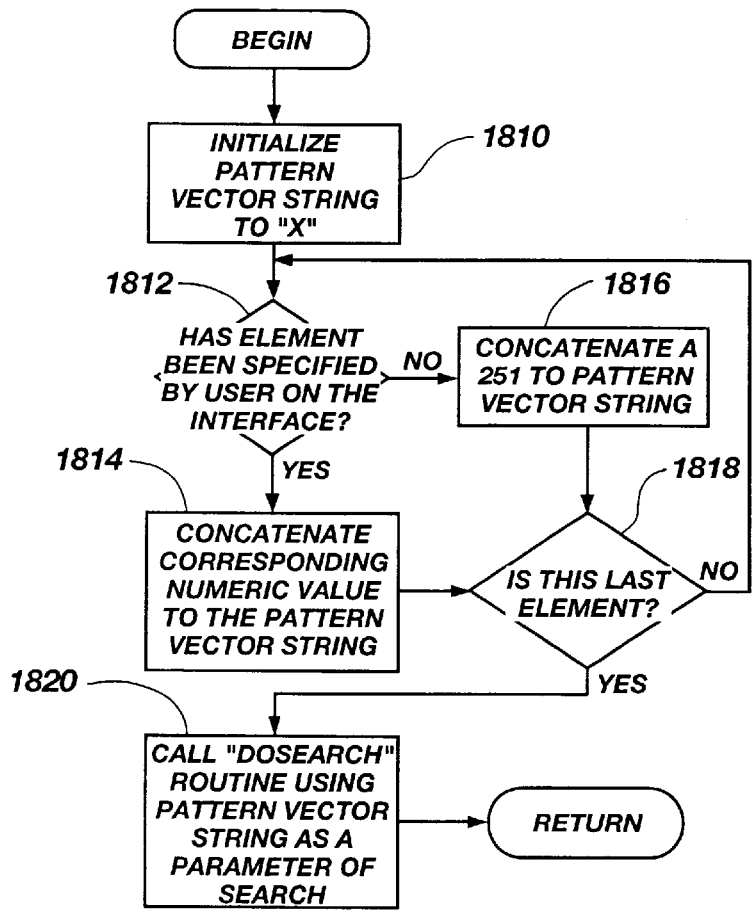
FIG. 17 depicts the generation of a pattern vector string used for locating a desired word sign according to the present invention.
Figure 18:
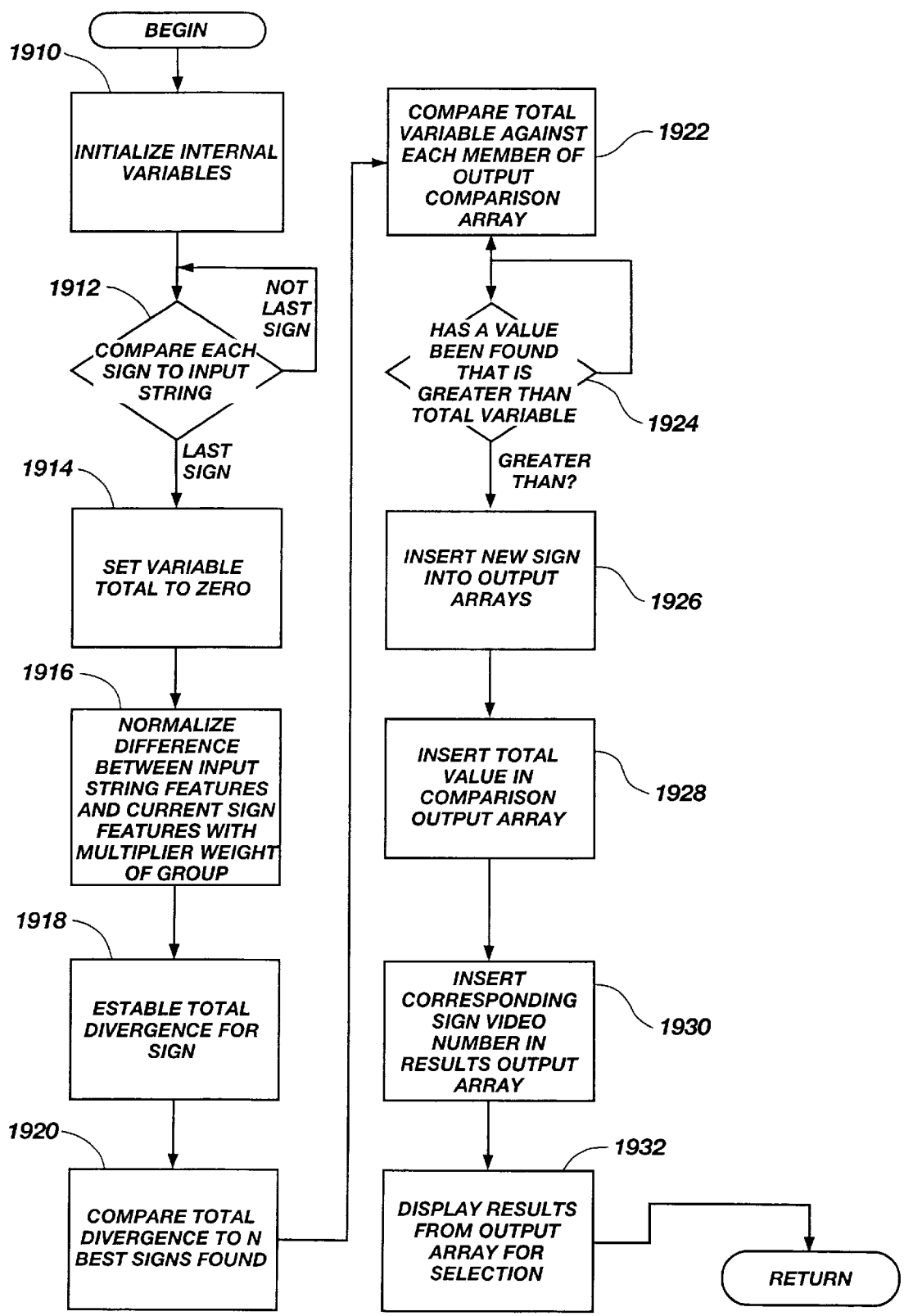
FIG. 18 is a block diagram highlighting the search and retrieval of a sign using the transcription method.

FIG. 16–18 depict flow diagrams of the functionality of the search engine and the classification parameter groups later described. The loading of the code into computer system 10 forms logic circuits that allow the system to encode, store, and retrieve visual signs or glosses. The search is performed in conjunction with the user specifying at least one group of features. Based on these features, the computer system searches for signs that have similar features and returns a group of desired signs for the user to review. From this group, the sign the user actually was seeking for will typically be available. These features are described in greater detail below. Beginning in FIG. 16, the program encodes the selected sign in block 1710. This is shown in greater detail in FIG. 17. Next, in block 1712, the sign is matched against signs stored in the system database. This is shown in greater detail in FIG. 18. FIGS. 17 and 18 are described below, after the search variables are disclosed and explained.

Figure 2:
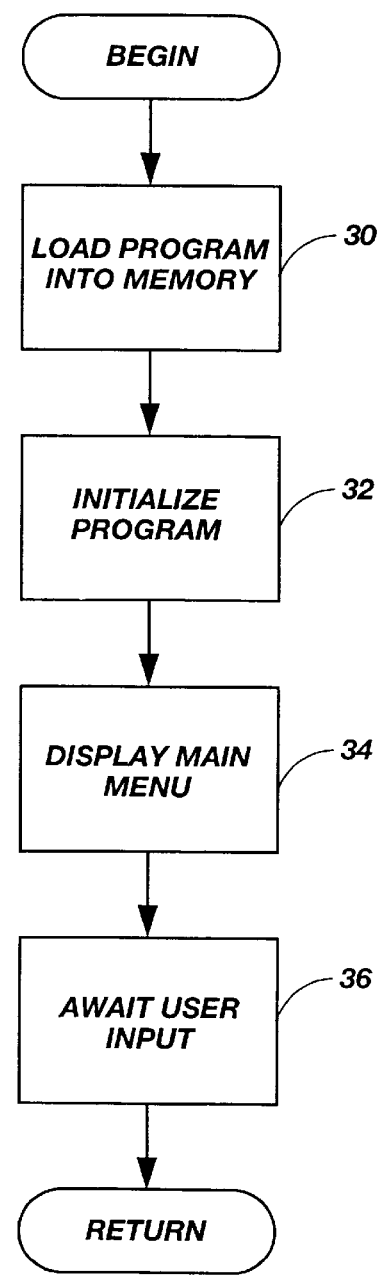
FIG. 2 is a block diagram of the initialization step of the program loaded in the computer FIG. 1.

When the system utilizes the computer-readable code, the program is first loaded into the short-term memory (RAM) of computer system 10. This is shown in the block diagram of FIG. 2. After the program has been loaded into short-term memory (block 30), computer system 10 then initializes itself to run the program under the appropriate operating system and GUI as shown in block 32. Next, after program initialization, which sets up the microprocessor to operate any executable programs within the main program as well as to initialize the video monitor 14, any audio system, as well as the user input devices such as keyboard 16 and mouse 18, the system displays a lexicon menu of the program in block 34. The lexicon menu display signifies to the user that the system is ready for user input. Once the system completes initialization and the lexicon menu is displayed, notifying the user that the system is ready for operation, the system, in block 36, awaits the user to input a request to use any of the particular features and functions of the program as controlled and processed by computer system 10. The sidebar menu displays features and functions that are accessible at anytime from all parts of the program during operation. Also, the sidebar menu can be disabled while another portion of the program is running, if desired.

The lexicon screen has an A–Z List of a selected number of common signs of the language, along with information about other possible meanings of those signs, that is accessible by the user. This list contains all available signs or glosses in the program and is organized in alphabetical order. The user can also conduct a Word Search, locating signs according to glosses (English equivalents) and alternate meanings. In addition to these features, a Parameter Search feature is provided that fills a gap long felt by learners of ASL. Many who have attempted to learn the language have been hindered by the problem of finding a meaning for a sign they have seen, but do not understand. The parameter search feature is implemented through the use of several methods and mechanisms: the transcription system, by which signs are translated into numerical vectors; the GUI design, which provides a user-friendly interface between the user and the transcription system; and the search engine, which accepts user input and returns search results based on specified fuzzy criteria.

Next, an outline and description of the method for encoding sign language is given; this is the basis for being able to encode, store, and retrieve the signs in an efficient and useful manner. This system and method uses American Sign Language for illustration; other languages are adaptable to this system of transcription such as British Sign Language or French Sign Language. In order to accomplish a useful and worthwhile system for encoding, there are two requirements:

(1) account for all linguistically significant details of the production of the signal; and (2) provide descriptive devices that permit a plausible linkage between the detailed surface representation and the underlying forms of the individual lexical items.

A parametric matrix is provided that contains slots for elements required to provide a phonetic representation of each sign or gloss that is as complete as possible. The parameter matrix allows the user to search the signs in the lexicon according to their linguistic parameters. This is roughly equivalent to a database of the words of English (or another spoken language), which breaks them down phonetically. In this method and system, a (hold-movement-hold) syllable is structured according to the table in Table I.

TABLE I

Parametric classification:

| DOMINANT HAND | INITIAL | FINAL |
|---|---|---|
| HANDSHAPE | | |
| PALM ORIENT | | |
| LOCATION | | |
| MOVEMENT | | |

| NON-DOMINANT HAND | INITIAL | FINAL |
|---|---|---|
| HANDSHAPE | | |
| PALM ORIENT | | |
| LOCATION | | |
| MOVEMENT | | |

| NON-MANUAL BEHAVIOR | |
|---|---|
| | |

The first four elements describe the dominant hand and the second four elements describe the non-dominant hand, which includes an initial and final position in each case for the dominant and non-dominant hand.

Lastly, a non-manual slot is provided that defines non-manual behaviors that are lexical (not syntactic or prosodic) or quasi-lexical. Since most signs do not have specific non-manual behaviors, this space is generally a null value. This slot is important since non-manual behavior can make distinctions of meaning.

Next is presented a notation system to fill in the blanks in Table I. A handshape is a specific configuration of the fingers and thumb that function as a unit of articulation. Much sign language research conducted over the past several decades has focused on this single element; however, there is still a lack of consensus in the composition of features required for American Sign Language. To simplify the handshape notation, this system defines that each digit individually specifies a position and all the handshapes and language can be efficiently described.

The position of each of the four fingers can be described in two different ways: the degree to which it is extended or closed and whether is against or apart from the finger or fingers next to it. The position of the thumb, which can be opposed, unopposed, and inserted, among other things, is specified separately. The notation for fingers and thumbs is shown in Table II.

TABLE II

Handshape: Thumb Descriptors

| | |
|---|---|
| Unopposed, extended | 1 |
| Unopposed, hooked | 2 |
| Unopposed, adjacent index | 3 |
| Opposed, Open | 4 |
| Opposed, touching pad(s) of flattened finger(s) | 5 |
| Opposed, touching tip(s) of curved finger(s) | 6 |
| Opposed, touching back of single curved finger | 7 |
| Opposed across back(s) of closed finger(s) | 8 |
| Opposed, flat against palm | 9 |
| Inserted, between index & middle | 10 |
| Inserted, between middle & ring | 11 |
| Inserted, between ring & pinkie | 12 |

Handshape: Spacing Descriptors

| | |
|---|---|
| Space between extended fingers | 1 |
| No space between extended fingers | 0 |

Handshape: Finger Closure Descriptors

| | |
|---|---|
| Closed | 1 |
| Hooked | 2 |
| Curved | 3 |
| Flattened | 4 |
| Bent | 5 |
| Extended | 6 |
| Crossed | 7 |

The feature descriptors are given a number value for simplicity; however, other notations may be provided such as alpha values, or a combination of alpha-numeric values, or any other type of notation desired.

Each handshape is represented by six elements. The first is the Thumb specifier. The Thumb specifier indicates the position of the thumb. After the separator "\" is the spacing specifier. The spacing specifier indicates whether the open fingers of the handshape are open (1) or closed (0). The remaining four digits indicate the degree of extension or closure of the four fingers. This covers the index finger, middle finger, ring finger, and pinkie, respectively.

Figure 3:
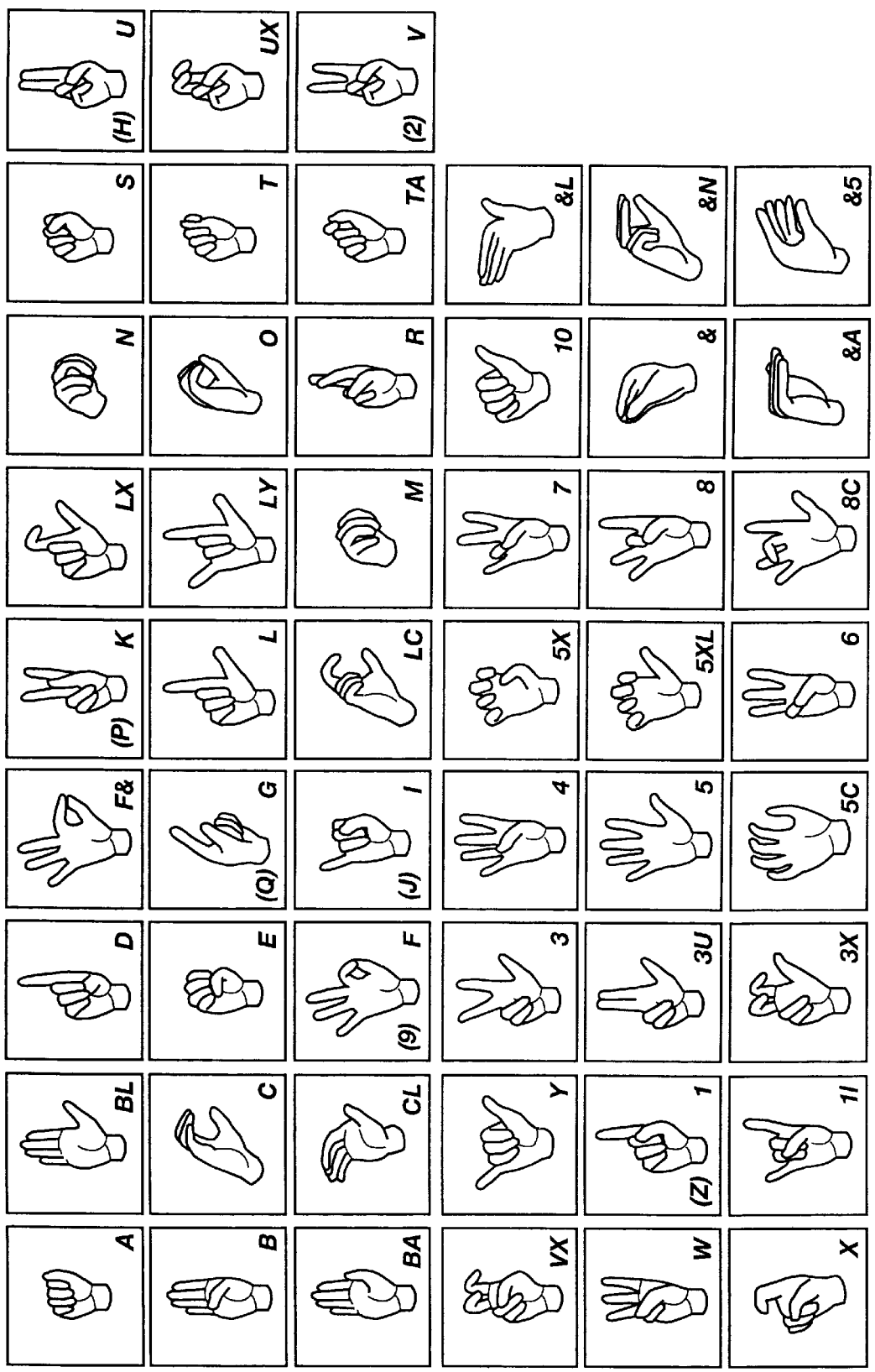
FIG. 3 is a block diagram of the various hand shapes used in representing different syllables in signed words.

Table III provides a list of the handshapes used in the present invention's GUI, described according to this notation system. An example of the handshapes is further shown in FIG. 3. The names for the handshapes are intentionally connected to the names for these letters and numerals. This is so the transcription system is as mnemonically helpful as possible.

TABLE III

GUI Handshapes

| | | | | | |
|---|---|---|---|---|---|
| A-Hand | 3[0]1111 | M-Hand | 12[0]2221 | 3U-Hand | 1[0]6611 |
| B-Hand | 9[0]6666 | N-Hand | 11[0]2211 | 3X-Hand | 1[1]2211 |

TABLE III-continued

GUI Handshapes

| | | | | | |
|---|---|---|---|---|---|
| BA-Hand | 3[0]6666 | O-Hand | 6[0]3333 | 4-Hand | 9[1]6666 |
| BL-Hand | 1[0]6666 | R-Hand | 8[0]7711 | 5-Hand | 1[1]6666 |
| C-Hand | 4[0]5555 | S-Hand | 8[0]1111 | 5C-Hand | 4[1]5555 |
| CL-Hand | 1[0]5555 | T-Hand | 10[0]2111 | 5X-Hand | 2[1]2222 |
| D-Hand | 6[0]6333 | TA-Hand | 3[0]2111 | 5XL-Hand | 1[1]2222 |
| E-Hand | 9[0]2222 | U-Hand | 8[0]6611 | 6-Hand | 7[1]6663 |
| F-Hand | 6[1]5666 | UX-Hand | 8[0]2211 | 7-Hand | 7[1]6636 |
| F&-Hand | 5[1]4666 | V-Hand | 8[1]6611 | 8-Hand | 7[1]6366 |
| G-Hand | 4[0]4111 | VX-Hand | 8[1]2211 | 8C-Hand | 1[1]6566 |
| I-Hand | 8[0]1116 | W-Hand | 8[1]6661 | 10-Hand | 1[0]1111 |
| K-Hand | 10[1]6611 | X-Hand | 8[0]2111 | &-Hand | 5[0]4444 |
| L-Hand | 1[0]6111 | Y-Hand | 1[0]1116 | &A-Hand | 3[0]4444 |
| LC-Hand | 4[0]5111 | 1-Hand | 8[0]6111 | &L-Hand | 1[0]4444 |
| LX-Hand | 1[0]2111 | 1I-Hand | 8[0]6116 | &N-Hand | 4[0]4411 |
| LY-Hand | 1[0]6116 | 3-Hand | 1[1]6611 | &5-Hand | 4[1]4444 |

Figure 4:
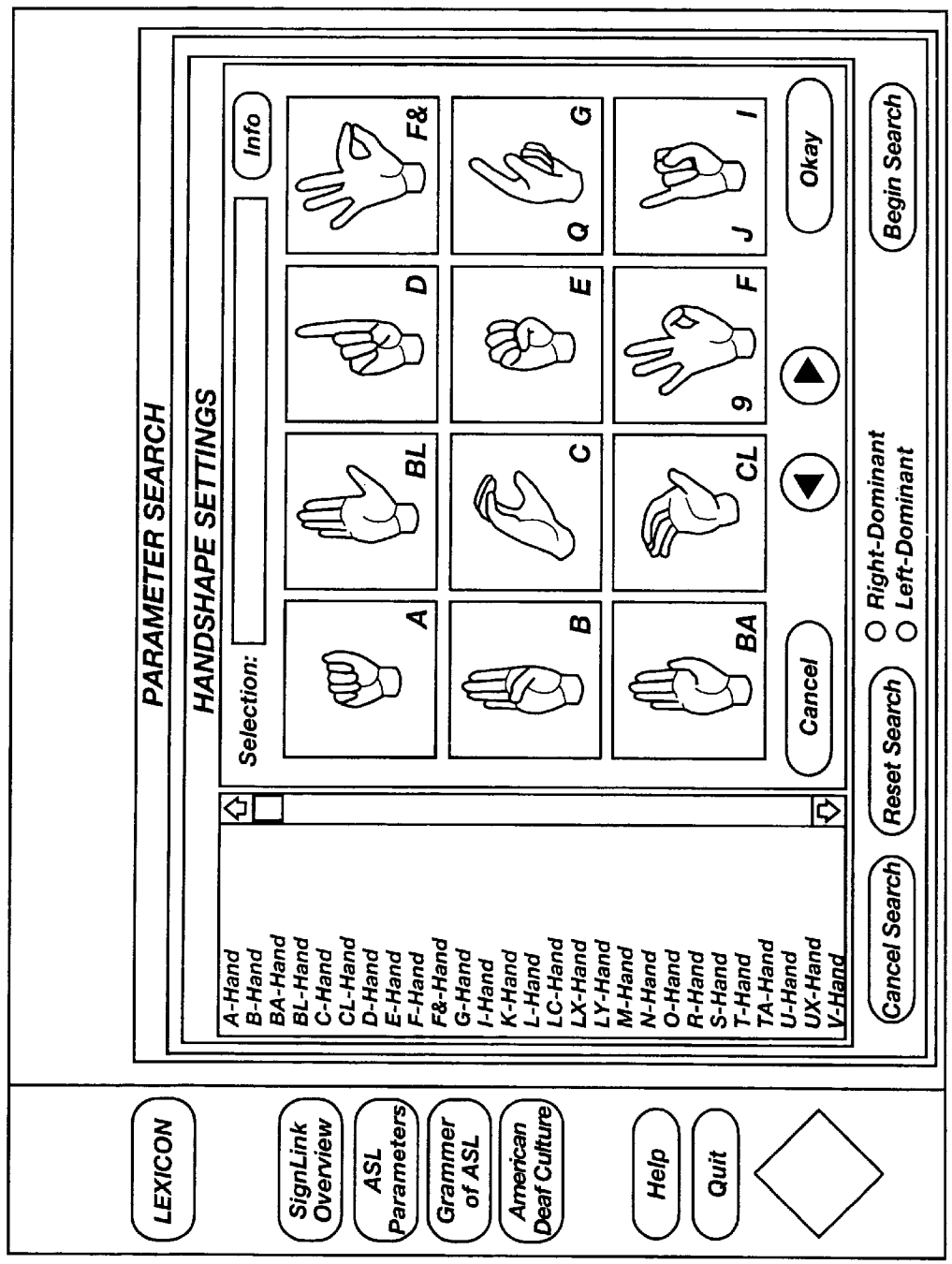
FIG. 4 is a diagram illustrating the hand symbol of FIG. 3 as depicted on the system according to FIG. 1.

This list is used in the computer system 10 and an example of the GUI selection window is shown in FIG. 4.

The handshape window provides a scrolling list of possible handshapes that are represented by graphics. The boundary boxes around the handshapes highlight on rollover and change color and produce a sound when selected to notify the user that a selection has been made. Selection is made by clicking on a particular handshape or by clicking on a selected word in the scrolling list.

The number of handshapes in a particular portion of a syllable is determined by the movement and number of hands involved; the total is typically from one to four, though contours of three of more handshapes on a single hand also occur. One-handed syllables usually use either one handshape (GIRL, KING) or two (BOY, LIKE), depending upon whether the handshape changes during execution of the sign. Some lexicalized finger spellings, such as x-#BACK-y may use as many as four handshapes. Two-handed syllables in which the hands perform either parallel or mirrored movement can have either two (PERSON, CLOTHES) or four (ADOPT, HOW-MANY) handshapes, since any change in handshape in this type of syllable must occur in both hands. In two-handed syllables where the non-dominant hand is a point of articulation rather than an articulator, there can be either two (WORK, CHOCOLATE) or three (LEARN, NEXT-YEAR) handshapes, since only the dominant hand can change handshape during production. The handshape for the non-dominant hand in this type of syllable is limited to a set of seven unmarked handshapes that, in this notation, are: 5-Hand (1\16666), BA-Hand (3\06666), 1-Hand (8\06111), A-Hand (3\01111), S-Hand (8\01111), 0-Hand (6\03333), and C-Hand (4\05555).

In the present system, handshape changes are indicated by specifying an initial and final handshape for each hand, if applicable. To represent a handshape change that occurs only once, initial and final handshapes are indicated and the repetition vector in the movement cluster is set at 1×(1). To represent the doubled or trilled handshape change, initial and final handshapes are specified with the movement repetition vector set at 2×(2) or 3×(3), respectively.

Palm and finger orientation is now described. Palm orientation is the direction that the palm of the hand faces during execution of a sign using a specified handshape.

Figure 5:
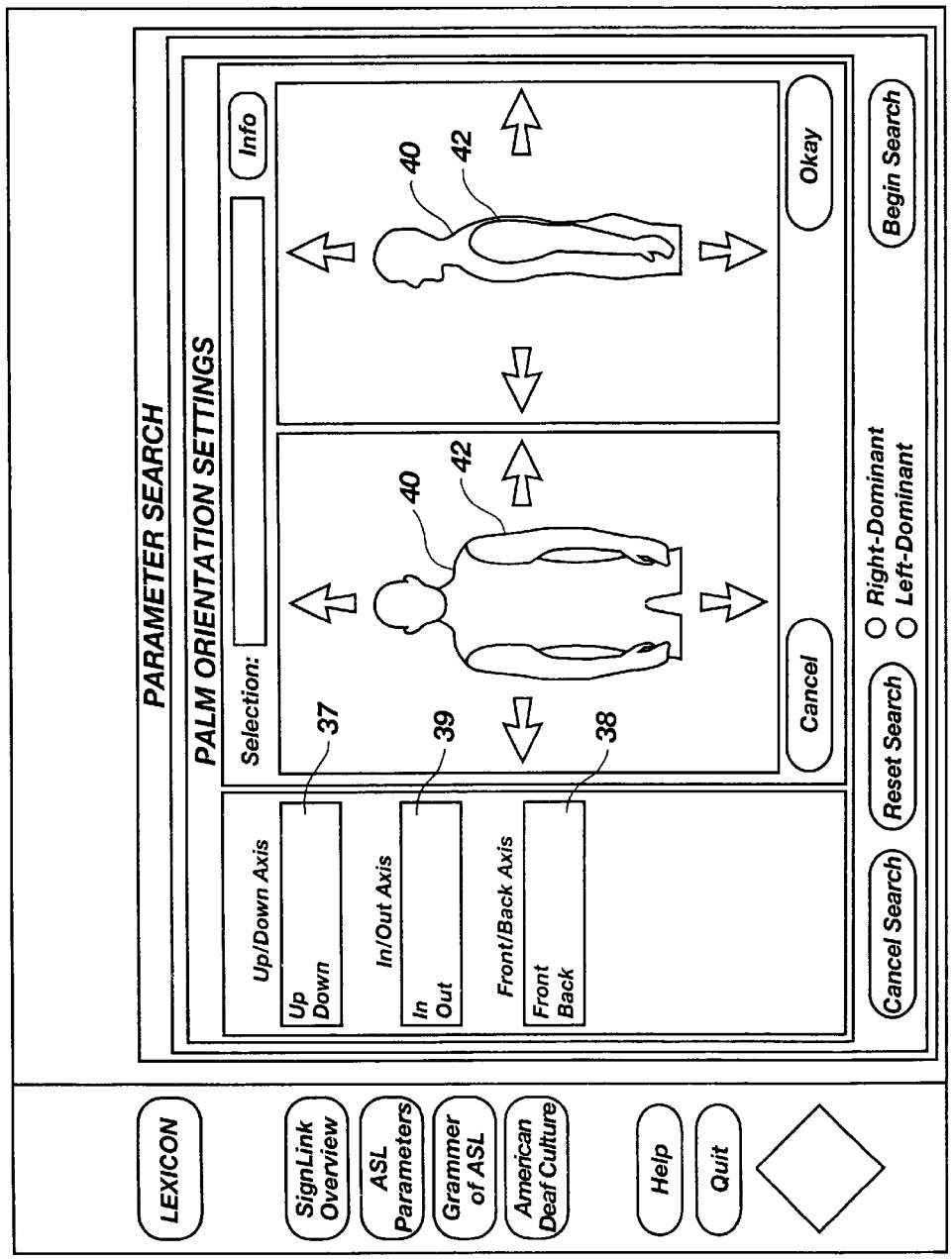
FIG. 5 is a Da Vinci style rendition for selecting palm orientation.

Palm orientation is classified with directional orientation according to three dimensions, up/down 37, front/back 36, and in/out 39. The orientation of FIG. 5 is further described with appropriate descriptors and definitions in TABLE IV.

TABLE IV

Palm Orientation

Up 1; Down 2; In 3; Out 4; Front 5; Back 6

In FIG. 5, a signer 40 is shown in silhouette form with the dominant or right hand 42 being shaded. Since signer 40 in FIG. 5 is right-dominant, the in direction in this case is leftward, or across the body. Likewise, the out direction is rightward, or away from the body. For a left-dominant signer, these directions are reversed.

In and out are identical to contralateral and ipsilateral, respectively. These terms are preferable to "left" and "right" as they more correctly capture the "mirror image" quality of signing than would otherwise be represented. Further, in and out are preferred because they are easier for users to grasp than the multi syllabic contralateral and ipsilateral.

It is important to understand the part or parts of the body to which the palm orientation feature refers. The notation indicates the direction faced, or pointed at, by the flat part of the palm, though not necessarily to the fingers. With open configurations, like the 5-hand (1\16666) and BL-hand (1\06666), the plane formed by the fronts of the fingers faces the same direction as the plane of the palm. With closed handshapes, such as the A-hand (3\01111)and E-hand (9\02222), the direction is not the same.

The palm orientation of a particular sign can be specified by using either one, two, or three dimensions. The more dimensions specified, the more complex the position. For example, a one-dimensional palm orientation might be up (non-dominant hand in SCHOOL) or front (both hands in DOOR) or in (both hands in AGENT-SUFFIX). A two-dimensional palm orientation might be up/back (final hold for both hands in ARRIVE) or back/in (PREGNANT) or down/out (SWIM). A three-dimensional palm orientation would have one element from each of the dimensions, such as up/back/in or down/front/in. Since a single palm orientation can never combine both elements from a single dimension, positions like *back/front and *up/down/out are impossible, which is indicated by the asterisk.

The number of palm orientations associated with a signed syllable depends on the movement of the syllable and the number of hands involved. One-handed syllables generally use one palm orientation (FATHER, NO) or two palm orientations (FRANCE, NOT-KNOW). Two-handed symmetrical syllables need two palm orientations specified (AGENT-SUFFIX, CAN) or four (DEAD, CONFESS), because any change has to occur in both hands. Two-handed asymmetrical syllables have either two (CHURCH, TOP) or three (COOK, older form of LATER), because the palm orientation of the non-dominant hand cannot change with this type of syllable.

The same basic types of movement that can occur with handshapes can also occur with palm orientations. For both single and trilled orientation changes, the initial and final positions are specified in the appropriate initial final position orientation slots. For single orientation change, the movement repeat specifier is set to 1×(1). For doubled or trilled orientation changes, this specifier is set to 2×(2) or 3×(3), respectively.

FIG. 5 illustrates the GUI selection window for palm orientation. The palm orientation window is represented by a Da Vinci-style front and side view diagram of a person as shown in FIG. 5. The direction arrows representing different possible directions are highlighted on rollover and change of color and sound produced when the particular directions selected. Selection can occur in the same manner as is made for handshapes. Further, one vector from three dimensions can be specified, for a total of up to three selections per palm orientation.

Next is provided a discussion on the location parameter. Every signed syllable has to occur in one or more places; those places are defined in the location parameter. The location of a syllable is specified according to its position in relation to parts of the signer's body. The system uses three dimensions to specify each location: the proximity (closeness) to the body 44, the placement's body part 46, and the lateralization 48 (side-to-side aspect) of the placement.

Although linguists generally agree on how to describe signs that touch or come close to touching the body, there is still a great deal of debate regarding signs that occur in the general signing space in front of the body.

The aspect of proximity is important because it distinguishes between locations that are on or near the body and locations that are away from the body. Locations which either touch or come close to touching the body are classified with either the touch (3) or the near (2) specifiers. All other locations are grouped under the heading of away, as in "'away from the body' (1)." Locations with this specification are considered to be in the signing space 50, which is basically the "empty air" that surrounds a signer.

For signs with touch or near proximity, the body part notation indicates the point on the body that the hand either touches or comes close to touching. For signs with away proximity, the body part notation describes the vertical level of the signing space location. In some cases, this is a rough estimate of the average height used by various signers. As pronunciation in spoken language varies, so does sign execution in sign language. This is important to understand about locations: the further the hands move from the body, the less accuracy with which locations can be described.

Figure 6:
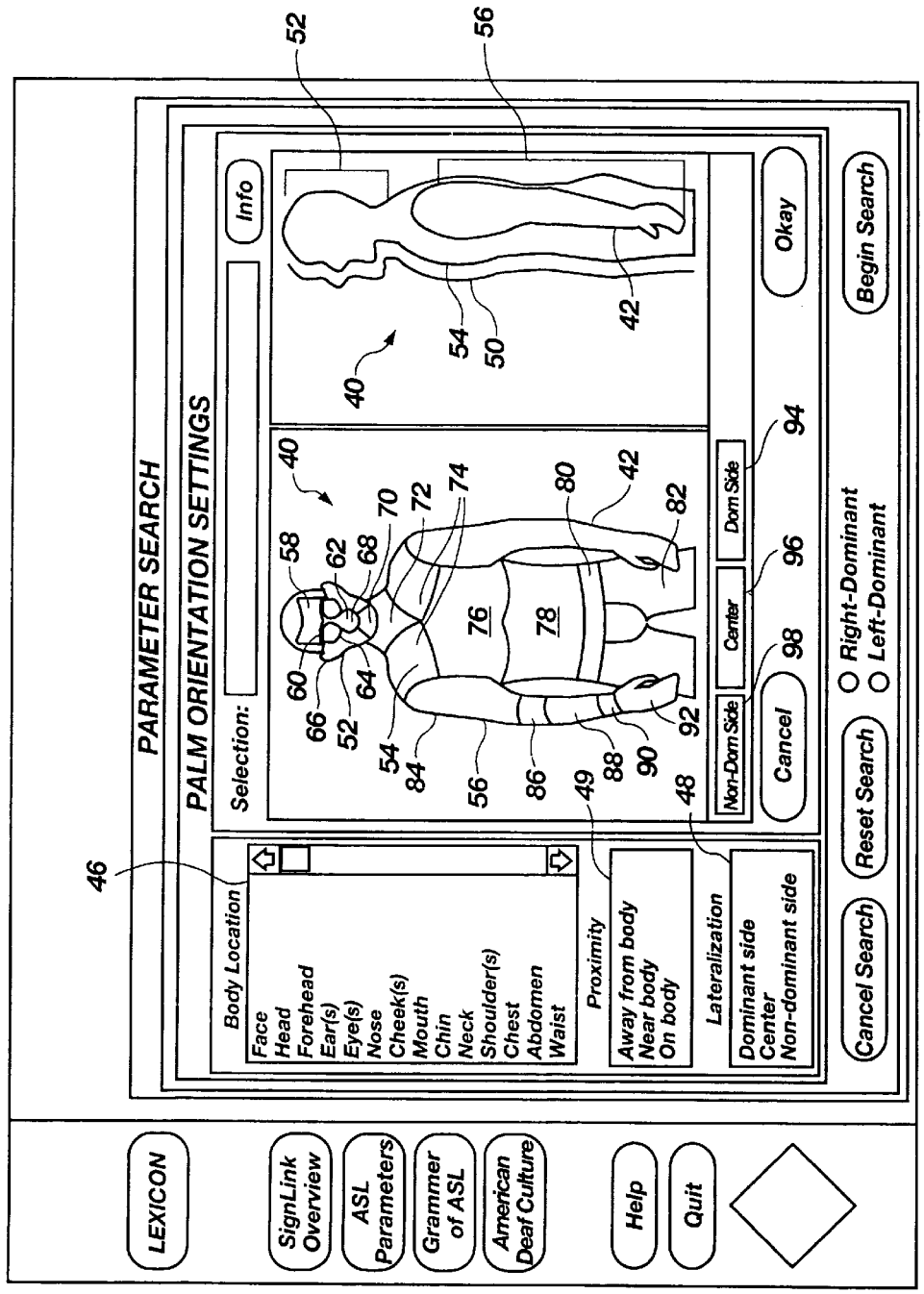
FIG. 6 is a representation of the hand positions relative to the signer's body.

There are three general areas on the body that are divided up for body parts: the head and neck 52, the torso 54, and the arm and hand 56. The head and neck area is divided into the forehead 58, eyes 60, nose 62, cheeks 64, ears 66, mouth 68, chin 70, and neck 72. The torso is divided into shoulders 74, chest 76, abdomen 78, waist 80 and legs 82. The arm and hand is divided into upper arm 84, elbow 86, lower arm 88, wrist 90, and hand 92. Some of these locations can be further subdivided laterally into dominant side 94, non-dominant side 96, and center 98. In addition, certain parts of the body which exist in pairs (such as eyes, cheeks, shoulders, and elbows) can be specified according to dominant or non-dominant side. An example of the GUI selection window for the location setting is shown in FIG. 6.

The location window is represented with a graphic of body parts that are labeled by text. The body locations are highlighted when the pointing icon rolls over them and a change of color and sound is produced when selected. Selection occurs in the same manner as for handshapes. Placement is defined by clicking on the area of the body where the sign occurs. If the sign occurs in the general signing space in front of the body, click in the center chest area. To de-select a placement, either click it again or select another to replace it. Proximity is defined using the side view box inset in the location window. To show that the location touches the signer's body, click directly on the figure's body. To show that the sign occurs in the signing space, away from the body, click on the large area in front of the figure's body. To show that the signer's hands come close to the body without touching, click the margin between the figure's body and the signing space.

When the parameter has been set and the floating window is closed, the section is inserted into the field for a specific section that has been set.

The locations in one-handed syllables are fairly simple to classify. Sometimes they involve a single location, either on or close to the body (as in MOTHER and LAZY), or in the general signing space in front of the body (as in TOILET and AIRPLANE). On the other hand, a one-handed syllable can involve a change in location, either body-part to body-part (as in MAN and DEAF), or body-part to signing space or the reverse (as in GRANDFATHER and STUFFED).

Two-handed symmetrical syllables can have either two or four locations, depending on movement. In symmetrical syllables that do not include a change of location, the hands will have parallel locations, either on the body (as in TIRED and EYEGLASSES), or in the signing space (as in TEACH and NONE). Sometimes, though, the hand locations in a two-handed sign with no movement can be different (as in SICK). Generally, when two-handed symmetrical syllables with movement occur, the change in location is parallel (as in LIVE and CLOTHES). For two-handed signs with connecting hands, (like TAKE-CARE), both hands are considered to be located about chest-height in the signing space (the away proximity). The connection between the hands is dealt with in the movement parameter, which indicates that the hands are in constant touch.

With two-handed asymmetrical syllables, the non-dominant hand generally acts as a base for the sign, and does not change location. With signs like WORK and CHURCH, the location of the non-dominant hand is the signing space, while the dominant hand is located on the non-dominant hand. With signs like LEARN and WIFE, the non-dominant is located stationary in the signing space, and the movement of the dominant hand either begins or ends on the non-dominant hand. A list of these locations used in the Location Settings in the parametric matrix of FIG. 6 is provided in Table V.

TABLE V

| Location: Body Part | | | |
|---|---|---|---|
| Face | 1 | Head | 2 |
| Forehead | 3 | Ear(s) | 4 |
| Eye(s) | 5 | Nose | 6 |
| Cheek(s) | 7 | Mouth | 8 |
| Chin | 9 | Neck | 10 |
| Shoulder(s) | 11 | Chest | 12 |
| Abdomen | 13 | Waist | 14 |
| Leg(s) | 15 | Upper arm(s) | 16 |
| Elbow(s) | 17 | Forearm(s) | 18 |
| Wrist(s) | 19 | Hand(s) | 20 |

| Location: Proximity | | Location: Lateralization | |
|---|---|---|---|
| Away from body | 1 | Dominant side | 1 |
| Near body | 2 | Center | 2 |
| On body | 3 | Non-dominant side | 3 |

With two-handed balanced signs, meaning those in which both hands have the same handshape and identical (though sometimes alternated) path or local movements, the hands can either contact body locations (as in RETIRE and LIVE), contact each other (as in SOCKS and CONTINUE), move freely in the signing space (as in SIGN and PLAN), or exhibit a combination of these location types.

Figure 7:
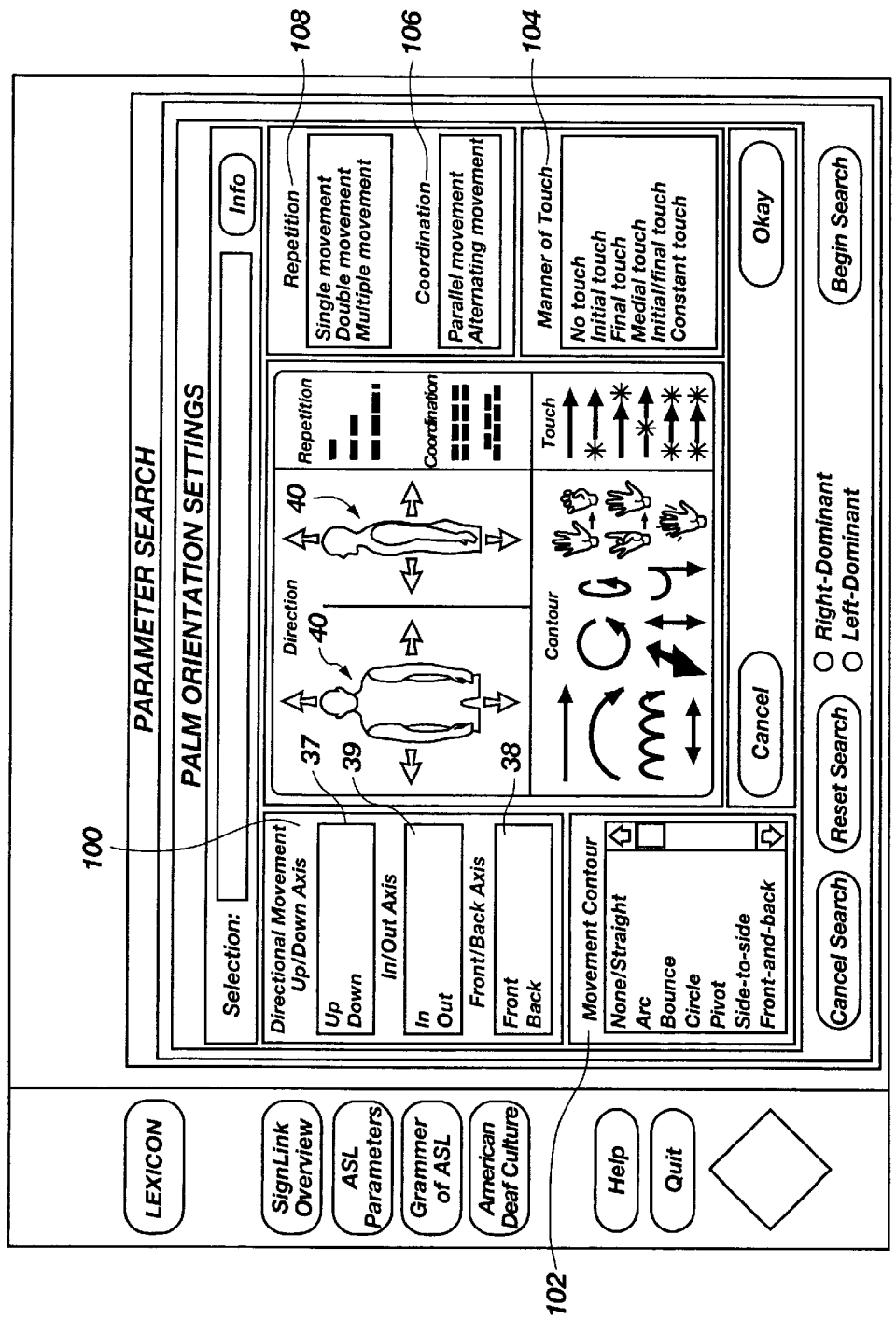
FIG. 7 illustrates a graphical rendition of a signer's hand movements.

Movement is the most difficult parameter to classify because it is the most complex. To define the movement of signed language, the system breaks the parameter down into several distinct aspects and these aspects are shown in the diagram of FIG. 7. The aspects are directional movement 100, movement contour 102, manner of touch 104, coordination 106, and repetition 108. Each of these qualities adds to the overall meaning of the sign. When taken as a group, these elements compose the movement of a sign. The movement features are selected either by clicking on the movement icons in the center of the selection window, or by clicking on the feature fields at the periphery of the window, or by a combination of both methods. Once the movement is selected, a corresponding weighting code is used to define the selected movement for search purposes.

There is one other type of movement that is not specified as part of the movement parameter: change from one handshape, palm orientation, or location to another handshape, palm orientation, or location. Since this type of movement is already specified in the description for the other parameters, it is not specified as part of the movement parameter.

Directional movement 100, is the simplest element of movement, and probably the easiest to describe. Directional movement is specified according to the three dimensions which describe palm orientation: up/down 37, back/front 38, and in/out 39. As with palm orientation, these dimensions can be combined to form more complex directions.

Sometimes directional movement is redundant. For example, the sign HUNGRY begins at the center of the chest and ends at the center of the abdomen, remaining in contact with the body the whole time. This movement can be described as a change in body location: from chest center to abdomen center. The movement can also be described as having a downward direction.

In other cases, however, direction is not redundant. For example, the first position of both hands in the sign GET-ALONG is chest-height, away from the body. Since the next position of the syllable is simply further away from the body, a frontward directional movement is the only way to describe the movement that occurs.

The movement contour 102 quality is used to describe what the hands are doing either during a directional movement or while stationary in a particular position. For example, in the sign GRANDMOTHER, the hand begins on the chin and moves forward into the signing space. While performing this movement, the hand makes a series of short arcs, bouncing forward into the signing space. In contrast, the similar movement in TELL does not include the bouncing contour. The types and associated weighting codes that are used when selecting the desired movement contour are shown in Table VI.

TABLE VI

| Movement: Contour | | | |
|---|---|---|---|
| None/Straight | 1 | Arc | 2 |
| Bounce | 3 | Circle | 4 |
| Pivot | 5 | Side-to-side | 6 |
| Front-and-back | 7 | Up-and-down | 8 |
| Hook-drop | 9 | Finger flex | 10 |
| Finger flick | 11 | Finger wiggle | 12 |

A good example of movement contour that does not accompany directional movement is the small circular movement in the sign SORRY. The hand does not change location; the movement stays in the general area of the center chest. The up-and-down tapping in the sign NAME and the finger wiggling in the sign COOL are also examples of this type of movement.

The manner of touch quality specifies if some sort of touch either hand-to-hand or hand-to-body, occurs during production of a sign. Many signs, such as GET-ALONG and BLUE, have no touch at all. Sometimes a touch occurs at the beginning of a syllable, as in GRANDFATHER or EARLY, or at the end of a syllable, as in ARRIVE and LOCKED. A touch that occurs in the middle part of the syllable is usually characterized by a brushing or tapping motion, as in EXCUSE-ME and SOMETIMES. A syllable can also have a touch at both beginning and end, as in GARBAGE and DEAF. Finally, a touch can last the duration of the syllable, as in the sign LONG. The types and associated values for touch movements is listed in Table VII.

TABLE VII

| Movement: Manner of Touch | |
|---|---|
| No touch | 1 |
| Initial touch | 2 |
| Final touch | 3 |
| Medial touch | 4 |
| Initial/final touch | 5 |
| Constant touch | 6 |

The coordination quality only applies to two-handed signs in which both hands move. It describes whether the hands are moved at the same time or one at a time. Any time the hands are moved while touching, as in TAKE-CARE and RUN, the movement will be parallel. Some examples of parallel movement where the hands do not touch include ROAD, PERSON, and TEACH. Some good examples of alternating movement include SIGN and WALK. A list of types of coordination movement with associated values is shown in Table VIII.

TABLE VIII

| Movement: Coordination | |
|---|---|
| Parallel movement | 1 |
| Alternating movement | 2 |

The repetition quality indicates whether a movement is done once or more than once. Often, single and double movement is used to distinguish between noun-verb pairs, such as CHAIR and SIT. In pairs like this, the nouns have repeated movement, while the verbs have single movement. Single and double repetition is fairly specific, while multiple repetition is less so. The movement in signs with multiple repetitions can occur three, four or even more times, depending on context. Some examples of this type of repetition include the signs TOILET and SORRY. The types of repetition movements with associated values are shown in Table IX.

TABLE IX

| Movement: Repetition | |
|---|---|
| Single movement (1X) | 1 |
| Double movement (2X) | 2 |
| Multiple movement (3X) | 3 |

Figure 8:
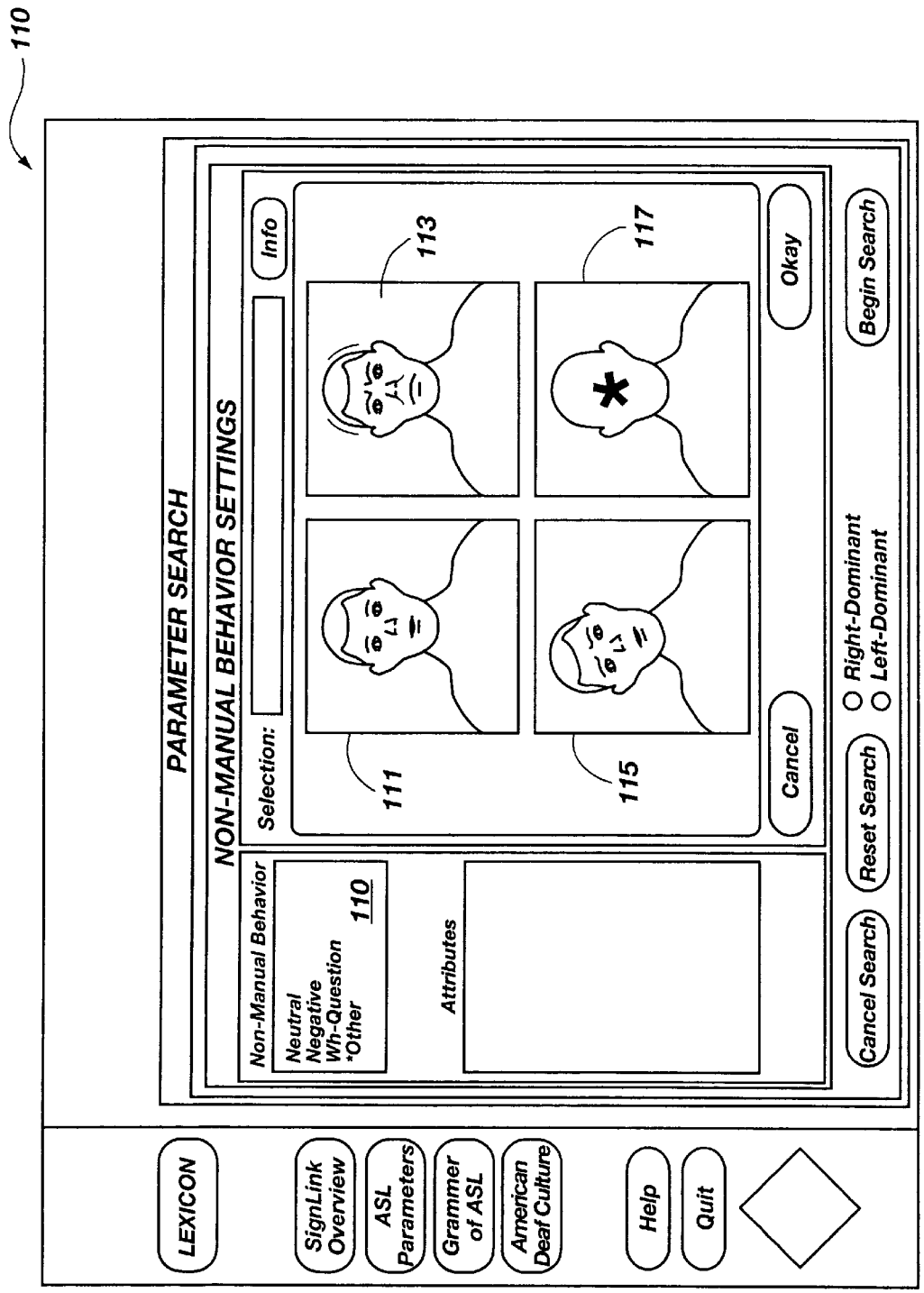
FIG. 8 illustrates a graphical representation of the signer's non-manual behavior.

The non-manual behavior 110 notation is now described and shown in FIG. 8. Although much of American Sign Language is conveyed through the hands, much information in the language is also conveyed by parts of the body other than the hands and arms. Signers use their faces, heads and bodies in specific ways as they sign. The importance of non-manual behavior is emphasized by the fact that, when signing in ASL, native conversant watch each others' faces, not hands.

Non-manual behavior is multi-channel. Non-manual behavior can involve a chin tilt, lip and tongue position, nose wrinking, brow position, eye blink and gaze, head posture, and body position. Neutral 111, negative 113, Wh-question 115, and other 117 non-manual behavior and their values are listed in Table X. The user, via screen 110, selects the desired non-manual behavior setting, if desired, and the system then converts the selection into a weighted code for subsequent search purposes. The codes are given below.

TABLE X

| Non-Manual Behavior | |
|---|---|
| Neutral | 1 |
| Negative | 2 |
| Wh-question | 3 |
| *Other | 4 |

There are ASL equivalents for such things as intonation and stress that is accomplished non-manually. Non-manual behavior is also a major indicator of sentence type; facial expression and head and body posture indicate whether a specific sentence is a yes or no question, a rhetorical question, a wh-question, or a negative sentence. Although the behaviors associated with yes/no and rhetorical questions are purely syntactic, the non-manual markers that indicate wh-questions and negatives are very often associated with specific wh- and negative signs.

In ASL, as in English, wh-questions 115 are formed by using special question words. These special signs include those commonly thought of as wh-words—WHO, WHAT, WHERE, WHY, HOW, and WHEN— as well as some other signs and combinations of signs that function in the same way, such as HOW-MANY, HOW+LONG and FOR—FOR. These signs are reserved almost exclusively for questions, and are only very rarely signed without their question-marking behaviors. Similarly, the sign most frequently used in ASL to create negative sentences is NOT.

Other commonly-used negative signs include NONE, NEVER, and CAN'T. These signs rarely occur without their non-manual marking.

Although wh-marking and negative-marking are both syntactic functions, they are quasi-lexical in the sense that they attach almost exclusively to particular signs. ASL dictionaries usually include these behaviors in pictorial representations of wh- and negation signs. In order to indicate these behaviors in this system, these grammatical/syntactic behaviors are considered lexical behaviors for the purposes of encoding.

Sometimes a specific sign requires a non-manual behavior as part of its execution. This type of behavior does not show anything 'extra;' the behavior is simply a requisite part of the sign. For example, the sign NOT-YET is distinguished from the otherwise identical sign LATE by a specific non-manual behavior i.e., opened mouth and thrust tongue. The mouth and tongue positions are the only features that distinguish between the two signs. Other signs require lexical behaviors and examples are SEARCH, which requires a 'searching' eye gaze, FIELD, MOUNTAIN, and RIVER are specifically indexed with eye gaze, and the sign YEAH requires twitching of the nose. Some other signs with required lexical behaviors include SLEEP and WAKE-UP.

Since there does not seem to be any way to predict these behaviors, and since they are so variably expressed, the only way to encode these lexical elements is to describe them individually. Thus, the notation for SEARCH should be something like searching eye gaze, and the notation for NOT-YET would be open mouth, thrust tongue. Since this type of description doesn't encode numerically, signs with this type of lexical non-manual behavior is simply marked as "other" 117. This notation indicates that some special non-manual behavior is required in the execution of the sign.

Negatives 113 are characterized by a side-to-side shaking of the head. Some signers add a frown, a wrinkled nose, or a squinted brow. Some signs which usually are accompanied by this behavior include NO, NOT, NEVER, NOT-YET, and NONE.

The list of non-manual descriptors is found in Table XI.

TABLE XI

GRAMMATICAL/LEXICAL NON-MANUAL DESCRIPTORS:

| | |
|---|---|
| wh-question | Face: squinted eyebrows, sometimes raised or drawn together |
| (wh-q) | Head: Chin tilted slightly up, or head cocked slightly to one side |
| | Posture: Raised shoulders or forward-leaning posture |
| negative | Head: head is shaken from side to side |
| (neg) | Face: furrowed brows, wrinkled nose, raised upper lip |

Using the weighting codes of Tables II–VIII, the computer system of encoding sign language signs into usable numerical vectors and descriptors can now be performed so that a user can quickly and efficiently find a sign and its meaning based on the descriptors previously described. The vector is a one dimensional array of the parametric code values used to define each gloss or sign. The system of operation involves two parts. The first part covers the interaction of the user's selecting and searching for signs. The second part covers how the system locates the appropriate sign based on the descriptors and notation entered by the user.

Figure 9:
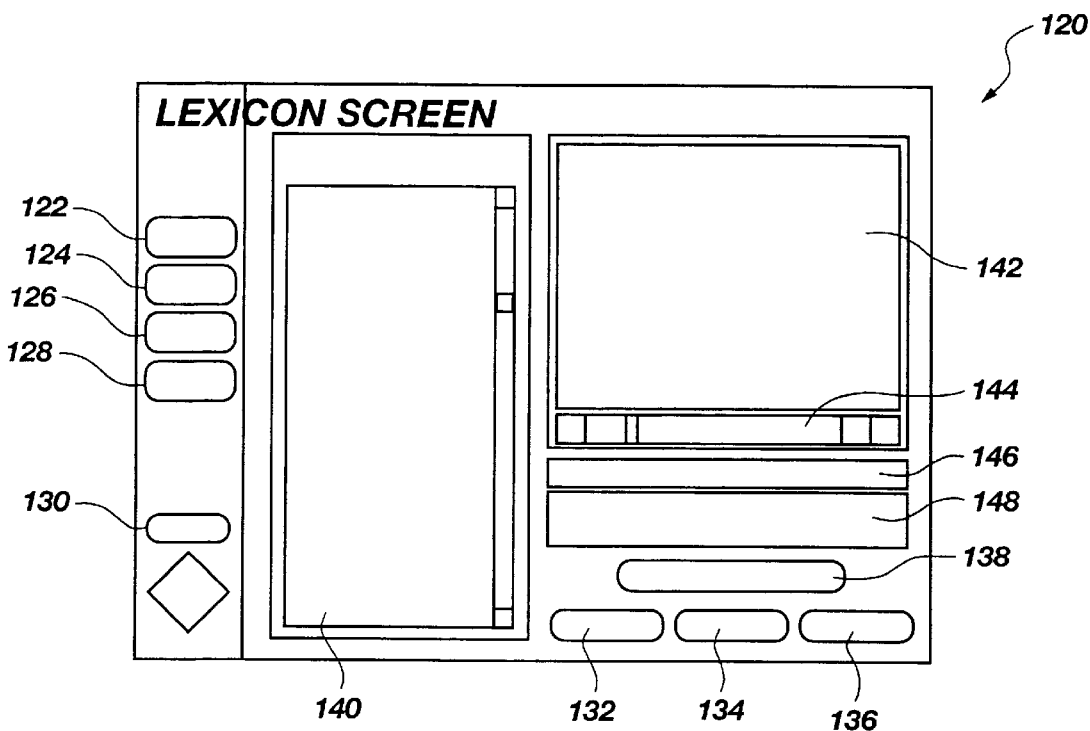
FIG. 9 illustrates a graphical representation of the lexicon screen displayed on the system of FIG. 1.

Referring back to FIG. 2, the computer system must undergo initialization with the computer usable code before operation can begin. Once the system is initialized with the program (Block 32) and the system is displaying the lexicon with its sidebar menu (Block 34), the system then awaits for user input in selecting what navigation options the user desires to pursue. FIG. 9 illustrates a sample screen 120 of the lexicon menu depicting four navigation options available to the user. The user selects the appropriate button by clicking on the button with the pointing device. This involves moving the cursor by the pointing device, such as a mouse, and then clicking on the icon with the left mouse button. The five options in this arrangement are lexicon button 122, overview button 123, ASL parameters button 124, ASL grammar button 126, and American deaf culture button 128. Further, help button 150 is provided that takes a user to various help sections for information. All these parts of the program are accessible through out other parts of the program at any time. Additional buttons are possible that can be used for any function desired by the programmer.

Figure 10:
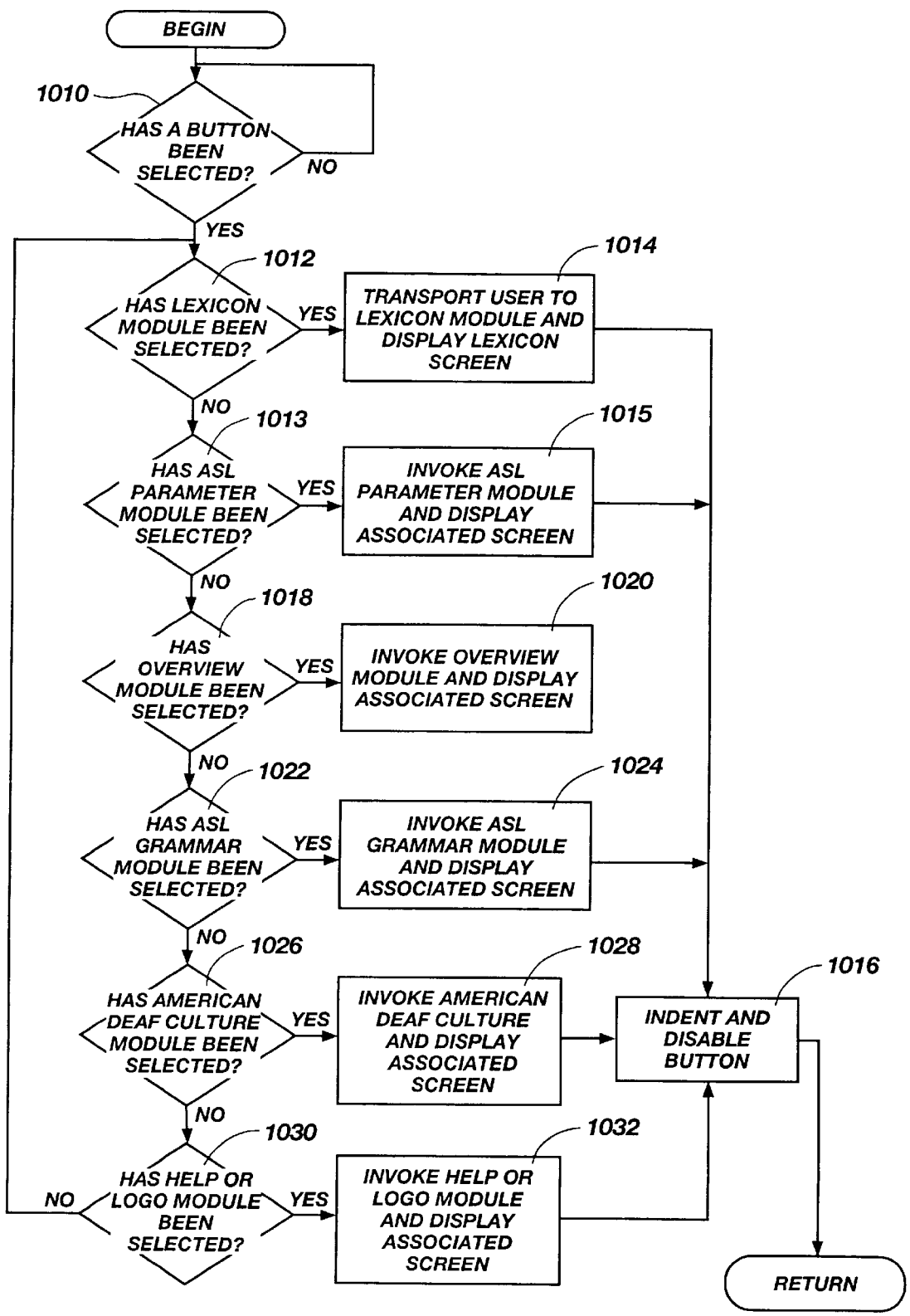
FIG. 10 is a block diagram depicting the user's interaction in selecting various modules invoked from the lexicon screen of FIG. 9.

When a particular button is selected, which is outlined in the block diagram in FIG. 10, the system determines which button is selected in block 1010. A button is selected when the pointing device icon rolls over the button image on the screen, which highlights the button, and the user clicks the pointing device to activate the button after the button is selected. If, in block 1012, lexicon button 122 is selected, the system, in block 1014, transports the user to the lexicon module and displays the lexicon screen. During this time, lexicon button 122 is disabled (block 1016). If, in block 1013, overview button 123 is selected, the system, in block 1015, transports the user to the overview module and displays the overview screen. During this time, overview button 123 is disabled (block 1016). If, in block 1018, ASL parameter button 124 is selected, then the system, in block 1020, takes the user to the ASL parameters module and displays an ASL parameters screen. Button 124 is disabled (block 1016) while the user is in the ASL parameters section. If ASL grammar button 126 is selected in block 1022, the system takes the user to the ASL grammar module and displays an ASL grammar screen in block 1024. If the user selects American deaf culture button 128 in block 1026, the system then takes the user to the American deaf culture module and displays an American deaf culture screen in block 1028. If help button 130 is selected in block 1030, then the system takes the user to the help screen in block 1032.

When lexicon button 122 is selected, the system displays lexicon screen 120 illustrated in FIG. 9. Lexicon screen 120 provides the user with various options. These options include an A–Z sign list button 132, a search by word button 134, a search by parameter button 136, a view parameter button 138 as well as several field and video control options. One field is a Vocabulary field 140 and another is a video screen 142 that has video controls 144. Selected Sign field 146 is provided as is the Other Meanings field 148.

Figure 11:
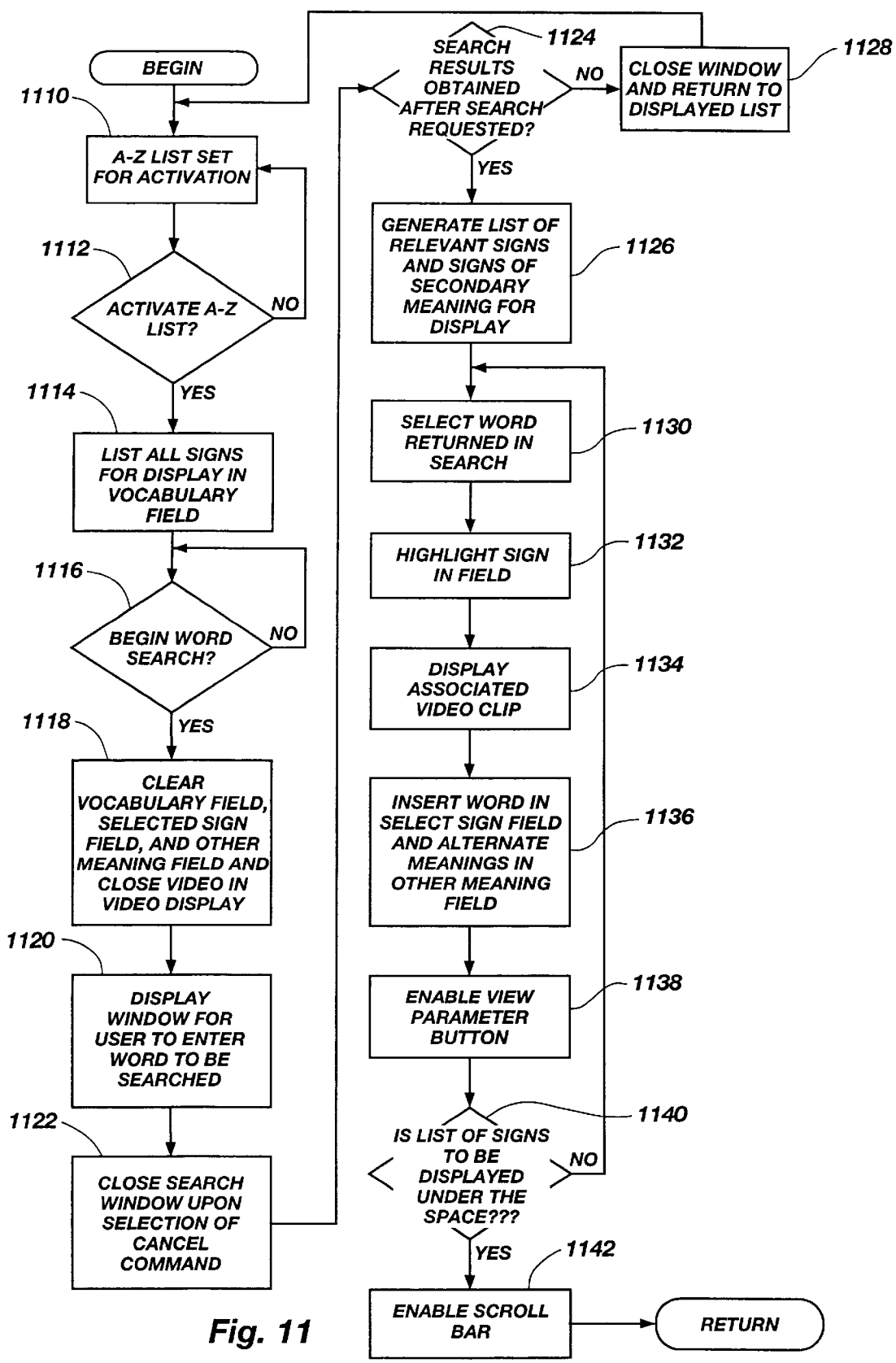
FIG. 11 a block diagram depicting a word search according to the present invention.

In FIG. 11, A–Z sign list 132 is the default button set when the user arrives at lexicon screen 120 (block 1110). The selection of A–Z sign list button 132 in block 1112 causes the entire list of signs, which includes variant meanings as separate entries, to be displayed in the vocabulary field 140 in block 1114. Further, when A–Z sign list button 132 is selected vocabulary field 140 is headed "A–Z List."

Vocabulary field 140 contains either an A–Z list of signs, when in A–Z sign list mode, or the list of matches for specific searches performed either under the search by word or the search by parameter modes. The title of this field is either "A–Z list" or "search results," depending upon the search mode. The user then clicks on a sign listed in this field (block 1130). In block 1132, the sign is highlighted in the field. In block 1134, the corresponding video clip is displayed on video screen 142. In block 1136, the word and alternate meanings are inserted into the select sign field 146 and other meaning field 148. In block 1138, view parameter button 138 is enabled. If the list of signs to be displayed in this field is too long to be displayed in the space provided (block 1140), the scroll bar buttons are enabled (block 1142). An up arrow button 158, located on the upper right corner of the field, scrolls the field up line by line and a down arrow button 160, located in the lower right corner of the field, scrolls the field down line by line. Moving a slider button 162, which is located between the upper arrow button and the down arrow button, scrolls the field to the appropriate point desired by the user. Clicking in scroll bar 164 scrolls the field page by page.

Figure 12:
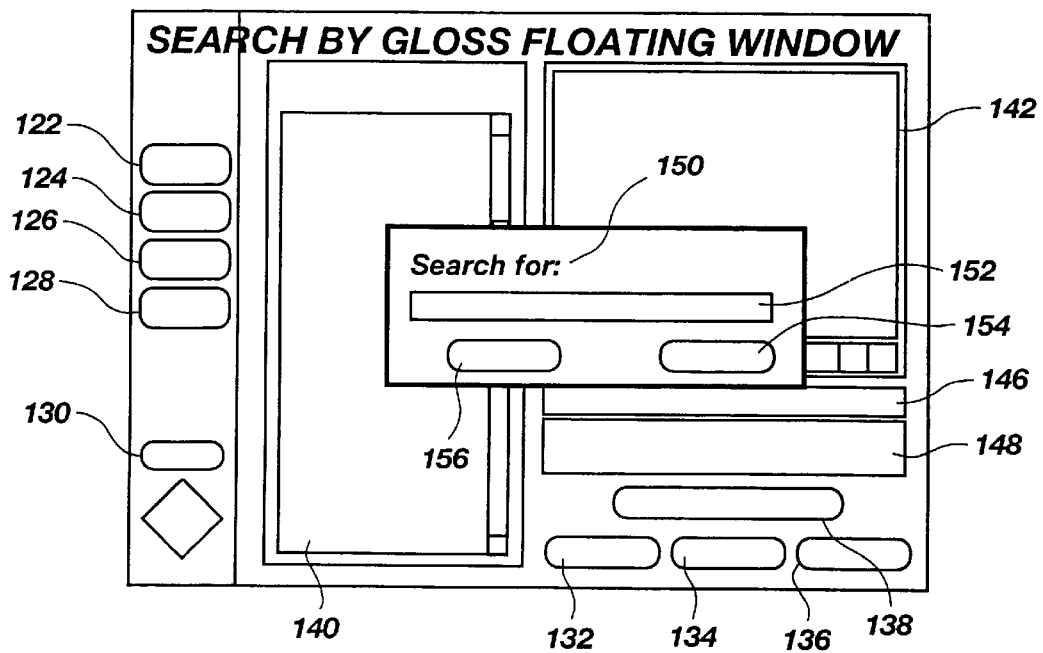
FIG. 12 depicts a screen searching for a word according to the present invention.

The search by word button 134 allows the user to search the sign database for a particular word. When selected in block 1116, the system initially clears vocabulary field 132, selected sign 146, and other meanings fields 148 and closes any video currently being displayed on video screen 142 in block 1118. Next, in block 1120, and as illustrated in FIG. 12, a floating window 150 appears that prompts the user to enter a word for a word search. Floating window 150 contains a text field 152, a cancel button 154, and a begin search button 156. If, in block 1122, the user clicks the cancel button 154 the window 150 is closed and the lexicon screen is automatically set to A–Z sign list mode FIG. 9. If, in block 1124, the user has selected begin search button 156 after a search string has been entered, the system makes a list of all the signs that include the search string as part of the word or as a secondary meanings (block 1126). This list is placed vocabulary field 140, which is retitled "search results." If begin search button 216 is pressed and no search string has been entered, the window, in block 1128, closes and the lexicon converts back to A–Z sign list mode of FIG. 9.

Once a search has been performed, the selected sign is displayed in the selected sign field 146. This field contains the sign currently on video screen 142 as well. The other meanings field 148 contains the meaning of the sign on the video screen. For example, the sign DIFFERENT is used like the English word "but." If DIFFERENT is selected on the vocabulary list 140, DIFFERENT is inserted into the selected sign field 146 and BUT appears in the other meanings field 148.

Once the sign is selected in the vocabulary field 140, a video clip appears on the video screen 142 begins playing automatically. Video controls 144 are provided so the user can manipulate the video image displayed. The video can be controlled in the following ways. The user can toggle between a play and pause mode by clicking on the play/pause button or by clicking on the video screen itself. The user can take the video forward one frame at a time by clicking on the frame forward button. The user can take the video backward one frame at a time by clicking on the frame backward button. By clicking on and dragging the video slider button across the video slider field, the field can be taken to a particular frame of the movie that corresponds to the X access ratio between start and finish. Lastly, the user can click on the video slider button bar to take the clip to the frame of the movie that corresponds to the X access ratio between start and finish. These video functions are well known to the skilled artisan.

Figure 14:
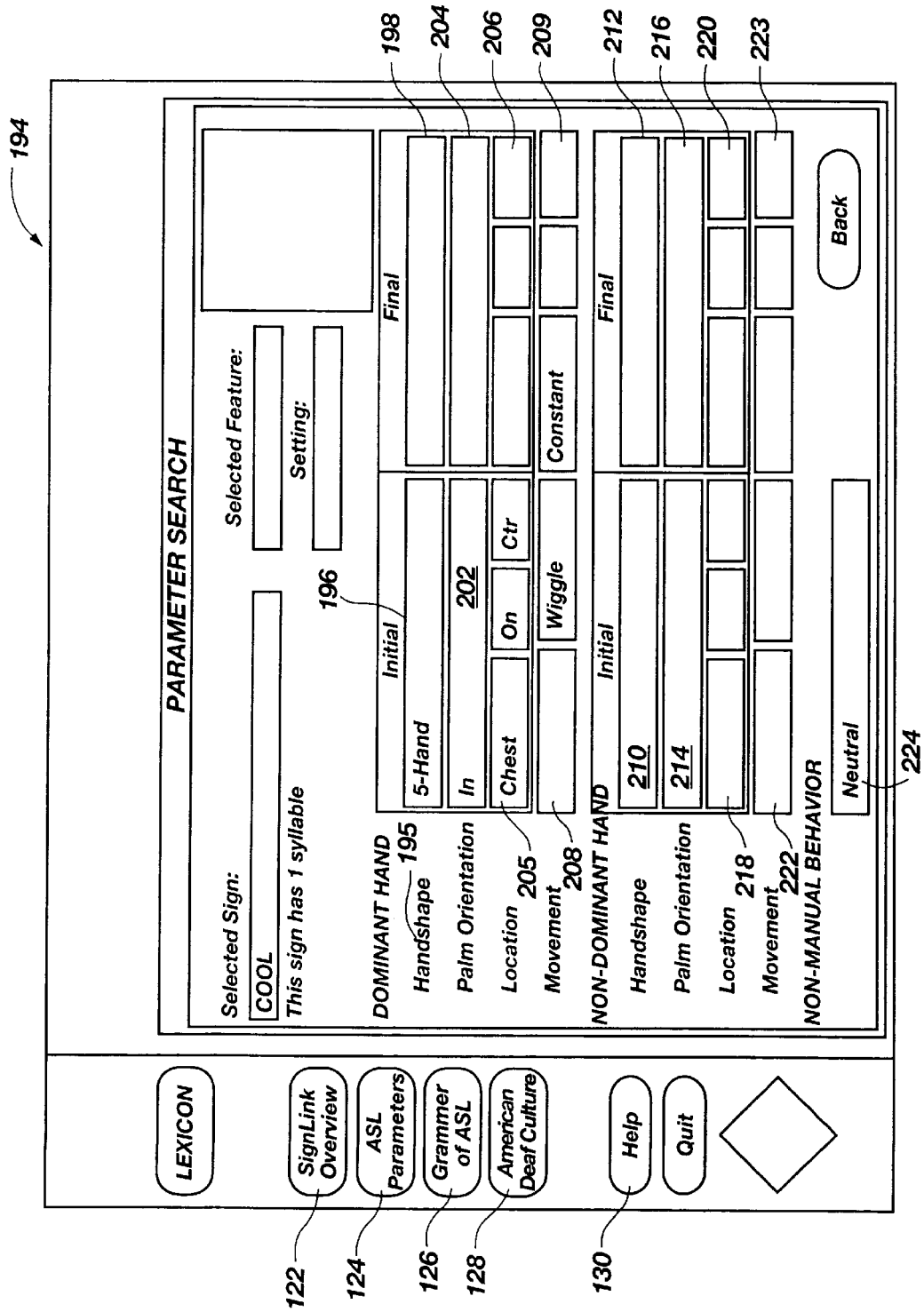
FIG. 14 depicts a parameter search result for the sign COOL.

The view parameter button 138 is only enabled when a sign has been selected and displayed on the video screen. Selecting this button takes the user to view parameters screen, which is designed to allow users to see how the individual signs in the database are broken down into their specific vectors. The view parameters screen is illustrated in FIG. 14. When the screen first opens, the vectors are inserted into their respective fields. The filled fields, but not the empty ones, highlight on mouse rollover. When a filled field is clicked, the parameter and its associated specifier are displayed in fields at the top of the screen, and an icon representing that specifier appears in the box next to the fields. Selecting the back button on the view parameter screen 170 returns the user to lexicon screen 120 of FIG. 9.

Figure 13:
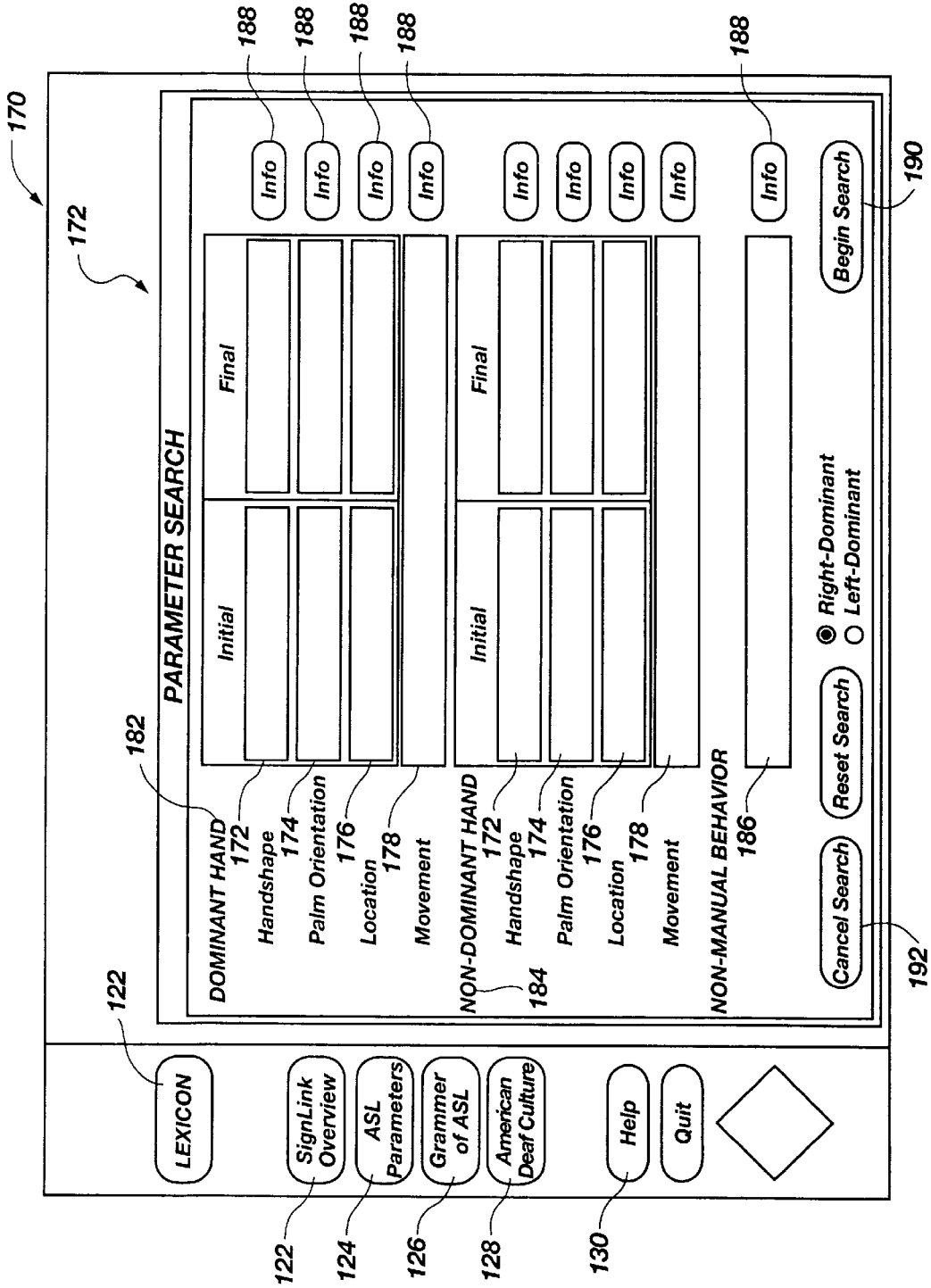
FIG. 13 depicts a field of view for entering parameter information for conducting a parameter search.

At any point while using the lexicon module, users can opt to conduct a parameter search. This done by clicking on the parameter search button, which highlights on rollover and animates on a button click. After clicking this button, the user is taken to the parameter search screen 170, which is illustrated in FIG. 13. In parameter search screen 170 a grid 172 with entries for the handshape 174, palm orientation 176, location 178 and movement 180 of the dominant hand 182 and the non-dominant hand 184 as well as for the non-manual 186 element of the sign is provided.

The parameter search screen 170 allows the user can set individual parameters that can be placed in a floating window that pops up in that particular parameter is selected. The grid 172 conforms to the transcription matrix in TABLE I. When a parameter is set, the code value is inserted into the parameter grid 172. This allows the user to keep tabs on which parameters have been set and which have not been set. In addition, at that point the user can jump immediately to the help information and the parameter information for more thorough searching. The code values are shown in TABLES II–VIII, with their weighting being used for subsequent searching and retrieval.

Additionally, next to each parameter search field 170 is an information button. The information button 188 links the user to an information screen that explains the interface and how to use it, and provides the user with a link to the pertinent topic in the ASL parameters module. For example, selecting the information button next to one of the handshape lines in the grid takes the user to the screen explaining the handshapes dialog, which contains a link to the handshapes topic in the ASL Parameters module. Once the topic is selected, the setting is specified and then temporarily held in memory. If the user clicks on the back button on the ASL parameter topic page, the settings are inserted into the parameter grid and the search continues.

The begin search button 190 also highlights upon the pointing device rollover and provides animation and sound upon selection. When this button is selected, the settings are then sent to the search portion of the system and the user is returned to the lexicon screen 120 of FIG. 9. The resulting list of signs is then placed in the vocabulary field 140, which is then retitled "search results." If the begin search button is pressed and no settings are specified on the parameter grid, the lexicon returns to the previous mode and sign list.

A cancel button 192 provides the user the ability to return to the lexicon screen and sets it automatically to the previous mode and sign list.

The next section explains how the search engine takes user input from the parameter search screen and uses it to produce search results. In order to conduct the searches desired by the user, the system must establish a classification based on the particular word selected or desired to be searched. Accordingly, the classifications parameter group matrix 230 is depicted in FIG. 15. Matrix 230 depicts the various handshape positions, orientations, locations, and movements as well as the non-manual feature previously described in the encoding matrix of TABLE I. There are total number of 51 features in the system. An unsigned character string is used to communicate between the viewable program that the user interacts with and the actual searching that will be described below. Certain signs have a greater weight than others and their parameter groups are listed as follows. The dominant and non-dominant handshape starting and ending positions each constitute a group of six features each with allowed values of one through six. Their group weight is 54 each. This weighting is used to normalize the raw feature values, so that one group of features, such as the starting hand position, has no more affect as a whole on the classification than any other group of features. The group weights referred to here are the sum of the maximum allowed values of each feature in that group. A second set of weights, called multipliers, are used to make one group more important than another once those groups have been normalized. While it is possible to combine the two operations into one, it is preferred to first normalize with the group weights, then account for feature importance with the multiplier weights. At this point, multiplier weights for all feature groups except starting hand position are 1.0. The starting hand position multiplier weights are set at 1.5. The next four groups are the dominant hand and non-dominant hand orientation start and end points. They each only have one feature whose allowed value ranges from 1 to 63. The dominant and non-dominant hand location start and end point groups have three features each of which can range from 1 to 20. These groups have a weight of 2. The dominant hand movement and non-dominant hand movement groups contain five features, each of which can range from 1 to 63. Their group weight is 50. The last parameter group is the non-manual group with a single feature that ranges from 1 to 3; its group weight is 20.

FIG. 16–18 depict flow diagrams of the functionality of the search engine and the classification parameter groups of FIG. 15. The search is performed in conjunction with the user specifying at least one group of features. Beginning in FIG. 16, the program encodes the selected sign in block 1710. This is shown in greater detail in FIG. 17. Next, in block 1712, the sign is matched against signs stored in the system database. This is shown in greater detail in FIG. 18.

FIG. 17 is a flow diagram of the system encoding the sign for encoding and locating. In Block 1810, the system initializes the unsigned character pattern vector string to value "X." As there are 51 elements, for each of the 51 elements of the pattern vector, the system in Block 1812 determines if the elements have been specified by the user on the interface and if so in Block 1814, the system links or concatenates the corresponding numeric value to the pattern vector string. If, in Block 1812, the user has not specified an element, the system, in Block 1816, concatenates a particular value, in this case 251, to the pattern vector screen in order to flag the pattern matching engine to ignore that feature group in the matching process. The system then determines in block 1818 if this is the last element to be encoded. In Block 1820 the system calls a "DoSearch" command using "Search" using the pattern vector string as a parameter.

After the pattern vector string has been provided as a parameter, the system then proceeds to match the sign against those stored in the database. FIG. 18 is a flow diagram depicting how the search is performed. The procedure produces a list of the N closest matches to the user-specified unsigned character string, also called the input string, and passes the video numbers corresponding to those matches back to the user. A series of internal variables are used to accomplish this task.

In block 1910, the system initializes these internal variables, called the results output array and the comparison output array. Since there are N matches being returned, for example, N=30 or any other integer, the results output array contains N places that are each initialized to the number "−1" and the comparison output array also contains N places that are each initialized to the number "999999."

Next, in blocks 1912–1930, the system compares each of the signs in the database with the input string. To do this for one sign, the variable total, which stores the total divergence between the input string and the current sign, is initialized to 0 in block 1912. For each feature group where the user has passed valid numbers and not ignore flags, the difference between the input string features and the current sign features is normalized with the group weight in block 1914 and multiplied by the mutiplier weight for that group, and then, in block 1916, added to the total.

Once the total divergence has been established for a sign (block 1918), it is then compared, in block 1920, against the divergences for the 30 best signs found so far, which are stored in the output array. This is done, in block 1922, by comparing the "total" variable against each member of the output comparison array in order until a value greater than "total" is encountered. The new sign, in block 1924, is inserted into the output arrays at the point by shifting all the existing array elements down one, where the last element is removed, in both arrays and, in block 1926, inserting the "total" value in the comparison output array and, in block 1928, the corresponding sign video number in the results output array. In this manner, through the comparison procedure, there is always an ordered set of results that become increasingly refined as the sign database is traversed.

The final procedure is to return all the items in the results output array to the system for display (block 1930). The output string consists of a comma-delimited list of the number of results, followed by the video number of each result in turn. For the case where N=30, for example, the output string is initialized to "30," and then each element of the output results array is concatenated to the end of the string followed by a comma. Once the string is constructed, the procedure terminates and returns the results, based on the final string, to the user for review.

Figure 19:
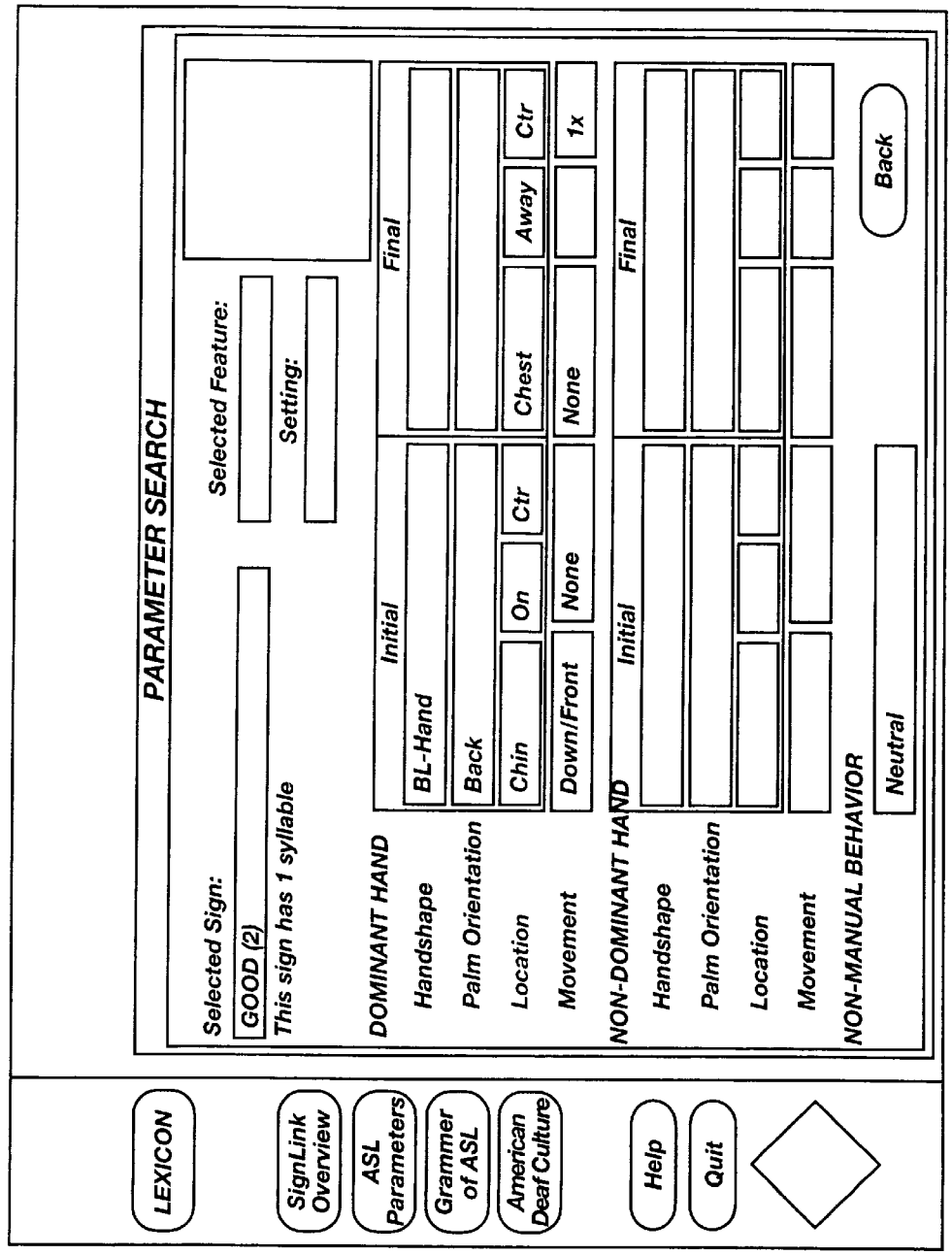
FIG. 19 depicts a parameter search result for the sign GOOD.

Examples of how the parameters are used along with the search strings are shown in FIGS. 14 and 20–22. FIGS. 14 and 20–22 are windows of the parameters associated with the given sign. The variables associated with the parameters are further illustrated in Tables XIII–XVI given below that are associated with a particular sign. GOOD is the first sign and is shown in FIG. 19. Its index number and parametric classification are provided as is the translation into numerical vectors. Further, the sign's entry value in the database is also given. The parametric classification is the description of the various parameters of handshape, palm orientation, location, movement, and non-movement. These parameters are translated into numerical vectors that, when concatenated, form a final vector, or array, used as the sign's entry value in the database. Blanks represent non-relevant parameters that need not be filled in. The blank portions are ignored when the vector is formed using the weighting codes of Tables II–VIII. Alternatively, "−", are placed in the slots to represent null information for the parameter. Null information results in a concatenation of commas in the vector. The next section gives examples of how signs are clarified and stored in SignLink's parameter database. Several types of signs are given, including the way they appear in the View Parameters window, how they translate into numerical vectors, and how they are ultimately stored in the SignLink database.

TABLE XIII

GOOD (2)
Index number: 404

Parametric classification:

| DOMINANT HAND | INITIAL | FINAL |
|---|---|---|
| HANDSHAPE | BL-HAND | |
| PALM ORIENT | BACK | |
| LOCATION | CHIN\|ON\|CENTER | CHEST\|AWAY\|CENTER |
| MOVEMENT | DOWN-FRONT\|NONE\|NONE\|/¯\|1X | |

| NON-DOMINANT HAND | INITIAL | FINAL |
|---|---|---|
| HANDSHAPE | | |
| PALM ORIENT | | |
| LOCATION | | |
| MOVEMENT | | |

| NON-MANUAL BEHAVIOR | NEUTRAL |
|---|---|

Parameters translated into numerical vectors:

| DOMINANT HAND | INITIAL | FINAL |
|---|---|---|
| HANDSHAPE | 1\06666 | |
| PALM ORIENT | 6 | |
| LOCATION | 9\|3\|2002 | 12\|1\|2 |
| MOVEMENT | 2\5\|1\|1\|−\|1 | |

| NON-DOMINANT HAND | INITIAL | FINAL |
|---|---|---|
| HANDSHAPE | − | |
| PALM ORIENT | − | |
| LOCATION | −\|−\|− | |
| MOVEMENT | −\|−\|−\|−\|− | |

| NON-MANUAL BEHAVIOR | 1 |
|---|---|

Sign's entry in database:
GOOD (2), 404,1\06666,,6,,9,3,2,12,1,2,2\5,1,1,,1,,,,,,,,,,,,,1

The next example is for the sign COOL, which is shown in FIG. 14. The index number, parametric classification, along with its translation and the sign's entry value in the database are provided in Table XIV.

TABLE XIV

COOL
Index number: 187

Parametric classification:

| DOMINANT HAND | INITIAL | | | | FINAL |
|---|---|---|---|---|---|
| HANDSHAPE | 5-HAND | | | | |
| PALM ORIENT | IN | | | | |
| LOCATION | CHEST | ON | CENTER | | |
| MOVEMENT | - | WIGGLE | CONSTANT | - | - |

| NON-DOMINANT HAND | INITIAL | FINAL |
|---|---|---|
| HANDSHAPE | | |
| PALM ORIENT | | |
| LOCATION | | |
| MOVEMENT | | |

| NON-MANUAL BEHAVIOR | NEUTRAL |
|---|---|

Parameters translated into numerical vectors:

| DOMINANT HAND | INITIAL | | | | FINAL |
|---|---|---|---|---|---|
| HANDSHAPE | 1\06666 | | | | |
| PALM ORIENT | 3 | | | | |
| LOCATION | 12 | 3 | 2 | | |
| MOVEMENT | - | 12 | 6 | - | - |

| NON-DOMINANT HAND | INITIAL | | | | FINAL |
|---|---|---|---|---|---|
| HANDSHAPE | - | | | | |
| PALM ORIENT | - | | | | |
| LOCATION | - | - | - | | |
| MOVEMENT | - | - | - | - | - |

| NON-MANUAL BEHAVIOR | 1 |
|---|---|

Sign's entry in database:
COOL,187,1\16666,,3,,12,3,2,,,,,12,6,,,,,,,,,,,,,,,,1

Figure 20:
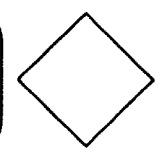
FIG. 20 depicts a parameter search result for the sign SIGN.

The next example is the sign SIGN, which is shown in FIG. 20. The index number, parametric classification, along with its translation and the sign's entry value in the database are provided in Table XV.

TABLE XV

SIGN (LANGUAGE)
Index number: 782

Parametric classification:

| DOMINANT HAND | INITIAL | | | | FINAL |
|---|---|---|---|---|---|
| HANDSHAPE | 1-HAND | | | | |
| PALM ORIENT | DOWN | | | | |
| LOCATION | CHEST | AWAY | CENTER | | |
| MOVEMENT | - | CIRCLE | NONE | ALT | 3X |

TABLE XV-continued

SIGN (LANGUAGE)
Index number: 782

| NON-DOMINANT HAND | INITIAL | | | | FINAL |
|---|---|---|---|---|---|
| HANDSHAPE | 1-HAND | | | | |
| PALM ORIENT | DOWN | | | | |
| LOCATION | CHEST | AWAY | CENTER | | |
| MOVEMENT | - | CIRCLE | NONE | ALT | 3X |

| NON-MANUAL BEHAVIOR | NEUTRAL |
|---|---|

Parameters translated into numerical vectors:

| DOMINANT HAND | INITIAL | | | | FINAL |
|---|---|---|---|---|---|
| HANDSHAPE | 8\06111 | | | | |
| PALM ORIENT | 2 | | | | |
| LOCATION | 12 | 1 | 2 | | |
| MOVEMENT | - | 4 | 1 | 2 | 3 |

| NON-DOMINANT HAND | INITIAL | | | | FINAL |
|---|---|---|---|---|---|
| HANDSHAPE | 8\06111 | | | | |
| PALM ORIENT | 2 | | | | |
| LOCATION | 12 | 1 | 2 | | |
| MOVEMENT | - | 4 | 1 | 2 | 3 |

| NON-MANUAL BEHAVIOR | 1 |
|---|---|

Sign's entry in database:
SIGN (LANGUAGE),
782,8\06111,,2,,12,1,2,,,,,4,1,2,3,8\06111,,2,,12,1,12,,,,,4,1,2,3,1

Figure 21:
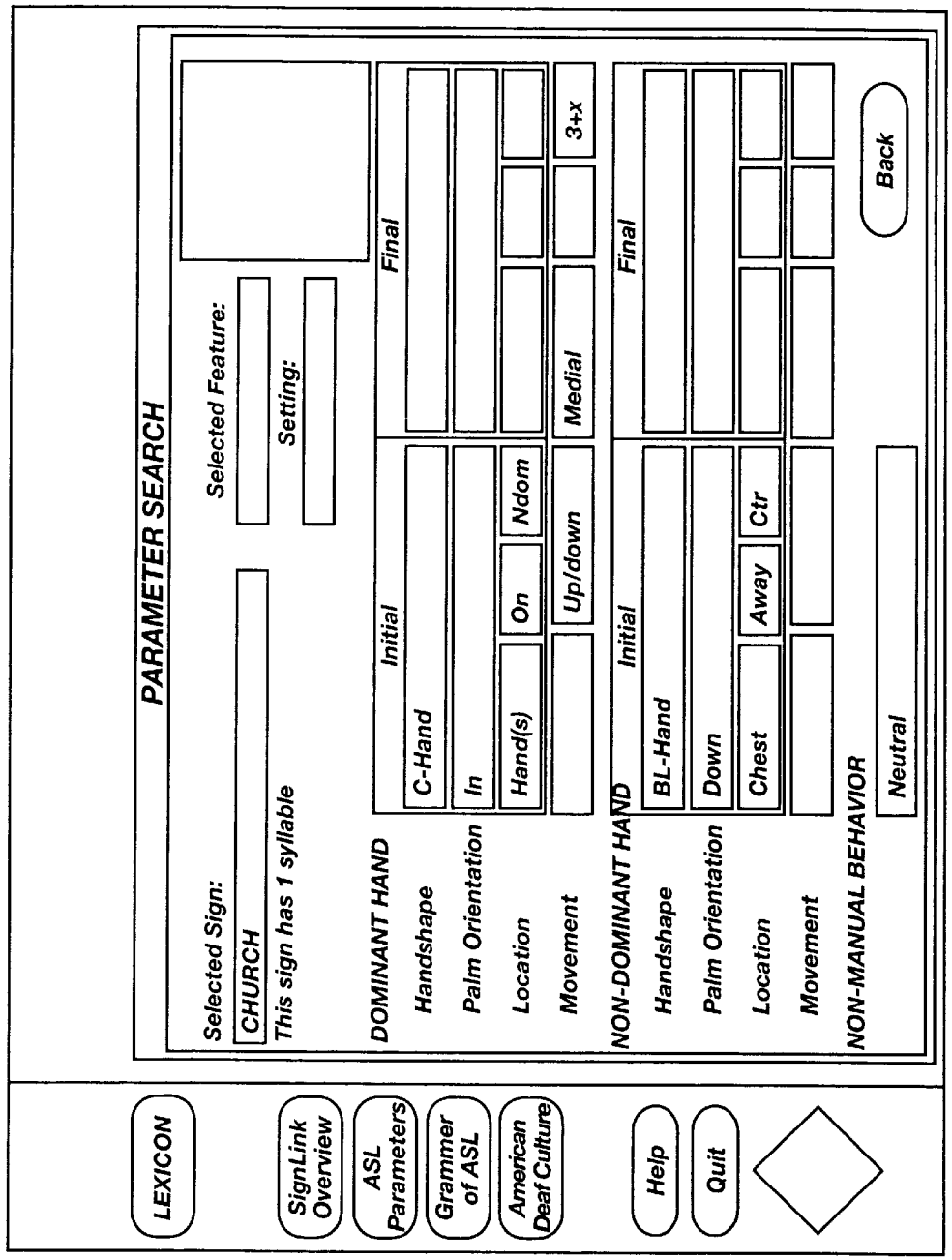
FIG. 21 depicts a parameter search result for the sign CHURCH.

The last example is for the sign CHURCH, which is shown in FIG. 21. The index number, parametric classification, along with its translation and the sign's entry value in the database are provided in Table XVI.

TABLE XVI

CHURCH
Index number: 156

Parametric classification:

| DOMINANT HAND | INITIAL | | | | FINAL |
|---|---|---|---|---|---|
| HANDSHAPE | C-HAND | | | | |
| PALM ORIENT | IN | | | | |
| LOCATION | HANDS | ON | NON-DOM | | |
| MOVEMENT | - | UP-DOWN | MEDIAL | - | 3X |

| NON-DOMINANT HAND | INITIAL | | | | FINAL |
|---|---|---|---|---|---|
| HANDSHAPE | BL-HAND | | | | |
| PALM ORIENT | DOWN | | | | |
| LOCATION | CHEST | AWAY | CENTER | | |
| MOVEMENT | | | | | |

| NON-MANUAL BEHAVIOR | NEUTRAL |
|---|---|

Parameters translated into numerical vectors:

TABLE XVI-continued

CHURCH
Index number: 156

| DOMINANT HAND | INITIAL | FINAL |
|---|---|---|
| HANDSHAPE | 4\05555 | |
| PALM ORIENT | 3 | |
| LOCATION | 20 \| 3 \| 3 | |
| MOVEMENT | - \| 8 \| 4 \| - \| 3 | |

| NON-DOMINANT HAND | INITIAL | FINAL |
|---|---|---|
| HANDSHAPE | 1\06666 | |
| PALM ORIENT | 2 | |
| LOCATION | 12 \| 3 \| 2 | |
| MOVEMENT | - \| - \| - \| - \| - | |

NON-MANUAL BEHAVIOR | 1

Sign's entry in database:
CHURCH,156,4\05555,,3,,20,3,3,,,,,8,4,,3,1\06666,,2,,12,1,2,,,,,,,,,,1

The present invention may be embodied in specific forms other than those of the preceding description, which are to be considered only as illustrative and not restrictive. Accordingly, the scope of the invention is indicated by the following claims, including equivalents thereof, rather than by the specific embodiments described in the preceding description.

What is claimed is:

1. A system that encodes signs in a given sign language that uses at least a first hand, said system comprising:
   means for defining a handshape of said first hand;
   means for defining a palm orientation of said first hand;
   means for defining a location of said first hand;
   means for defining a movement of said first hand;
   coding means, coupled to each of said means for defining, for assigning each handshape, palm orientation, location, and movement a corresponding code value;
   combining means, coupled to said coding means, for combining said code values of said handshape, palm orientation, location, and movement; and selecting means, coupled to said combining means, for selecting one or more corresponding signs using said combined code values, said selecting means operating to match said combined code value against a database of code values and to return from said database of code values a quantity of combined code values of one or more signs falling within a given range of code values.

2. The system of claim 1 wherein said combining means includes means for concatenating said code values in a numerical vector.

3. The system of claim 1 wherein said corresponding signs each have a defined parametric value.

4. The system of claim 1 further wherein said selecting means includes a database means for storing a plurality of sings each representing an individual meaning, each of said plurality of signs having a unique parametric value.

5. The system of claim 4 further comprising:
   program means associated with said combining means for converting said selected code values into video codes associated with a meaning stored in said database; and
   display means coupled to said converting means for displaying images reflective of said video codes.

6. The system of claim 1 further including:
   means, coupled to said coding means, for defining handshape, palm orientation, location and movement with code values of a second hand, said coding means being configured for assigning each handshape, palm orientation, location, and movement of said second hand a corresponding code value, said combining means for combining said second hand code values with said first hand code values to form said unique parametric value.

7. The system of claim 1 further comprising:
   means, coupled to said coding means, for defining a non-movement and assigning it an assigned code value and wherein said combining means combines said non-movement code value to said combined code values.

8. A system for encoding, storing and retrieving sign language having a plurality of individual signs, each of said plurality of individual signs having at least one article supplied by a first hand, said system comprising:
   computer means operable for receiving, storing, searching and retrieving information about a plurality of individual signs of a sign language and for generating image signals including image sign signals reflective of one or more individual signs, each of said plurality of individual signs having one or more articles supplied by a first hand, and said computer means being operable for generating image article signals reflective of one or more articles of signs of said sign language;
   input means connected to said computer means for communicating instructions to said computer from a user, said instructions including instructions to receive, store, search and retrieve information about said plurality of individual signs of said sign language including information about one or more articles of one or more individual signs;
   display means connected to said computer means to receive said image sign signals therefrom and operable to convert said image sign signals to images of one or more individual signs perceivable by the user and to receive said image article signals therefrom and operable to convert said image article signals to images of one or more articles of signs of said sign language; and
   a computer program for use in said computer means, said computer program being operable to:
      determine stored codes for each of said one or more articles of each of said plurality of individual signs stored in said computer, said one or more articles including one or more of the handshape, palm orientation, location and movement of said first hand of each individual sign of said plurality of individual signs,
      assemble said stored codes for each article of said plurality of individual signs of said sign language into a stored parametric value and to store said stored codes and said stored parametric value,
      cause image article signals to be generated and supplied to said display means for displaying images of one or more articles of the plurality of signs upon selection by the user by operation of said input means,
      enable said input means to be operated by the user for selecting one or more selected articles of a desired sign,
      determine a selected desired code for each selected one or more articles of a desired sign, cause a search to be made of the stored codes to identify those identified signs of the plurality of individual signs that include the selected code, and cause image sign signals to be generated and supplied to said display means of each of said identified signs.

9. The system of claim 8 wherein said computer program includes a weighting system for prioritizing the desired code of the several forms of each of the one or more articles of a desired sign in accordance with the importance of each of the said several forms in the desired sign from the most important to the least important, and wherein said computer program searches the stored codes for the most important desired code and causes image sign signals to be displayed in which the signs are displayed ranked with from the the closest match to the desired code in priority decreasing toward the least important.

10. The system of claim 9 wherein said stored code is concantenated into a numerical vector.

11. The system of claim 10 wherein said individual signs of said plurality of individual signs include at least one article supplied by said first hand and at least one article supplied by a second hand, and wherein said stored codes include one or more of the handshape palm orientation, location and movement of said second hand.

12. The system of claim 11 in which the input means may be operated to select a dominant hand of two hands.

13. The system of claim 12 in which the input means is configured for the generation and transmission to said computer means of read signals to search and identify image sign signals based on meaning and to display the meaning of identified signals.

14. The system of claim 13 wherein said one or more articles of said first hand includes non-manual behavior.

15. The system of claim 14 wherein said non-manual behavior has a plurality of forms including facial expression, body orientation, body posture.

16. The system of claim 15 wherein said image article signals cause said display means to display multiple forms of a selected article.

17. The system of claim 16 wherein said image article signals cause said display means to display a human shape and indica for selection of a form of a selected article of a desired sign and means to identify and select the form of the selected article.

18. The system of claim 17 wherein said input means is operable to instruct said computer means to supply operation signals to said display means for perception by the user, and wherein said input means is operable to communicate operation signals to said computer to cause video images of said image article signal to be controlled on said display means to cause said image being displayed to go forward and backward as if it were moving at the rate of one frame of a movie at a time.

\* \* \* \* \*

UNITED STATES PATENT AND TRADEMARK OFFICE
CERTIFICATE OF CORRECTION

PATENT NO. : 6,116,907  
DATED : September 12, 2000  
INVENTOR(S) : Baker et al.

Page 1 of 2

It is certified that error appears in the above-identified patent and that said Letters Patent is hereby corrected as shown below:

<u>Title page,</u>  
Item [56], "References Cited," in "OTHER PUBLICATIONS,"  
Line 2, after "Language." insert -- Linguistic Inquiry 23, pp. 407-441. --;  
Line 10, after "Wilbur" delete "27-46."; and  
Line 12, after "pp." insert -- 27-46. --.

<u>Column 7,</u>  
Line 65, change "3[0]1111" to -- 3\01111 --; change "12[0]2221" to -- 12\02221 --; and change "1[0]6611" to -- 1\06611 --;  
Line 66, change "9[0]6666" to -- 9\06666 --; change "11[0]2211" to -- 11\02211 --; and change "1[1]2211" to -- 1\12211 --;

<u>Column 8,</u>  
Line 5, change "3[0]6666" to -- 3\06666 --; change "6[0]3333" to -- 6\03333 --; and change "9[1]6666" to -- 9\16666 --;  
Line 6, change "1[0]6666" to -- 1\06666 --; change "8[0]7711" to -- 8\07711 --; and change "1[1]6666" to -- 1\16666 --;  
Line 7, change "4[0]5555" to -- 4/05555 --; change "8[0]1111" to -- 8\01111 --; and change "4[1]5555" to -- 4\15555 --;  
Line 8, change "1[0]5555" to -- 1\05555 --; change "10[0]2111" to -- 10\02111 --; and change "2[1]2222" to -- 2\12222 --;  
Line 9, change "6[0]6333" to -- 6\06333 --; change "3[0]2111" to -- 3\02111 --; and change "1[1]2222" to -- 1\12222 --;  
Line 10, change "9[0]2222" to -- 9\02222 --; change "8[0]6611" to -- 8\06611--; and change "7[1]6663" to -- 7\16663 --;  
Line 11, change "6[1]5666" to -- 6\15666 -; change "8[0]2211" to -- 8\02211 --; and change "7[1]6636" to -- 7\16636 --;  
Line 12, change "5[1]4666" to -- 5\14666 --; change "8[1]6611" to -- 8\16611 --; and change "7[1]6366" to -- 7\16366 --;  
Line 13, change "4[0]4111" to -- 4\04111 --; change "8[1]2211" to -- 8\12211 --; and change "1[1]6566" to -- 1\16566 --;  
Line 14, change "8[0]1116" to -- 8\01116 --; change "8[1]6661" to -- 8\16661 --; and change "1[0]1111" to -- 1\01111 --;  
Line 15, change "10[1]6611" to -- 10\16611 --; change "8[0]2111" to -- 8\02111 --; and change "5[0]4444" to -- 5\04444 --;  
Line 16, change "1[0]6111" to -- 1\06111 --; change "1[0]1116" to -- 1\01116 --; and change "3[0]4444" to -- 3\04444 --;

UNITED STATES PATENT AND TRADEMARK OFFICE
CERTIFICATE OF CORRECTION

PATENT NO. : 6,116,907
DATED : September 12, 2000
INVENTOR(S) : Baker et al.

Page 2 of 2

It is certified that error appears in the above-identified patent and that said Letters Patent is hereby corrected as shown below:

Column 8 contd.
Line 17, change "4[0]5111" to -- 4\05111 --; change "8[0]6111" to -- 8\06111 --; and change "1[0]4444" to -- 1\04444 --;
Line 18, change "1[0]2111" to -- 1\02111 --; change "8[0]6116" to -- 8\06116 --; and change "4[0]4411" to -- 4\04411 --;
Line 19, change "1[0]6116" to -- 1\06116 --; change "1[1]6611" to -- 1\16611 --; and change "4[1]4444" to -- 4\14444 --;

Column 9,
Line 58, change "initial final" to -- initial/final --;

Column 12,
Line 63, after "touch" insert -- , --;

Column 13,
Line 67, change "wrinking" to -- wrinkling --;

Column 19,
Line 25, change ""-1" to -- "-1" --; and
Line 26, delete """ at beginning of line.

Column 23, claim 4,
Line 61, change "sings" to -- signs --.

Signed and Sealed this

Ninth Day of April, 2002

*Attest:*

JAMES E. ROGAN
*Attesting Officer*   *Director of the United States Patent and Trademark Office*